United States Patent
Kim et al.

(10) Patent No.: US 8,933,881 B2
(45) Date of Patent: Jan. 13, 2015

(54) REMOTE CONTROLLER AND IMAGE DISPLAY APPARATUS CONTROLLABLE BY REMOTE CONTROLLER

(75) Inventors: Hyunjung Kim, Seoul (KR); Sungjong Park, Seoul (KR); Jaehoon Cho, Seoul (KR); Eunji Lee, Seoul (KR); Raghavendra Ramappa, Bangalore (IN); Krishna Prasad, Bangalore (IN); Kodandarama Suman Rajkumaar, Bangalore (IN)

(73) Assignee: LG Electronics Inc., Seoul (KR)

( * ) Notice: Subject to any disclaimer, the term of this patent is extended or adjusted under 35 U.S.C. 154(b) by 173 days.

(21) Appl. No.: 13/462,470

(22) Filed: May 2, 2012

(65) Prior Publication Data

US 2013/0002576 A1    Jan. 3, 2013

Related U.S. Application Data

(60) Provisional application No. 61/481,920, filed on May 3, 2011.

(30) Foreign Application Priority Data

Jul. 18, 2011    (KR) ................. 10-2011-0070968

(51) Int. Cl.
    *G06F 3/033*    (2013.01)
    *G06F 3/0346*    (2013.01)
    (Continued)

(52) U.S. Cl.
    CPC .. H04N 21/42224 (2013.01); *G06F 2203/0381* (2013.01); *G06F 3/0346* (2013.01);
    (Continued)

(58) Field of Classification Search
    CPC . G06F 3/03543; G06F 3/0383; G06F 3/0346; G06F 1/1626; G06F 3/0412; G06F 21/32; G06F 21/35; G06F 3/014; G06F 2203/0331
    USPC .................... 178/18.01–20.04; 345/156–179
    See application file for complete search history.

(56) References Cited

U.S. PATENT DOCUMENTS 5,483,261 A * 1/1996 Yasutake ........................ 345/173
6,573,883 B1 * 6/2003 Bartlett ......................... 345/156

(Continued)

FOREIGN PATENT DOCUMENTS

CN    1701298 A    11/2005
CN    101802755 A    8/2010

(Continued)

*Primary Examiner* — Alexander Eisen
*Assistant Examiner* — Sanjiv D Patel
(74) *Attorney, Agent, or Firm* — Birch, Stewart, Kolasch & Birch, LLP

(57) ABSTRACT

A remote controller and an image display apparatus controllable by the remote controller are disclosed. The image display apparatus includes a display, an interface for receiving from the remote controller a signal based on a motion of the remote controller or a signal based on a touch input on the remote controller, and a controller for operating the image display apparatus in motion mode to control the image display apparatus according to the motion of the remote controller, if the degree of the motion is equal to or larger than a reference value and operating the image display apparatus in touch mode to control the image display apparatus according to the touch input on the remote controller, if the degree of the motion is smaller than the reference value.

9 Claims, 17 Drawing Sheets

(51) Int. Cl.
  *G06F 3/01* (2006.01)
  *H04N 21/426* (2011.01)
  *H04N 21/41* (2011.01)
  *H04N 21/485* (2011.01)
  *H04N 21/422* (2011.01)
  *G06F 3/0488* (2013.01)

(52) U.S. Cl.
  CPC ............ *G06F 3/017* (2013.01); *H04N 21/426* (2013.01); *H04N 21/4126* (2013.01); *H04N 21/485* (2013.01); *H04N 21/42222* (2013.01); *G06F 3/0488* (2013.01)
  USPC .......................................... 345/157; 345/173

(56) References Cited

U.S. PATENT DOCUMENTS

| | | | |
|---|---|---|---|
| 6,947,062 B2* | 9/2005 | Cuijpers et al. | 715/767 |
| 8,549,443 B2* | 10/2013 | Irvine | 715/863 |
| 2005/0057509 A1* | 3/2005 | Mallett et al. | 345/163 |
| 2005/0212752 A1* | 9/2005 | Marvit et al. | 345/156 |
| 2005/0212753 A1* | 9/2005 | Marvit et al. | 345/156 |
| 2007/0080940 A1* | 4/2007 | Aoki et al. | 345/158 |
| 2007/0146321 A1* | 6/2007 | Sohn et al. | 345/158 |
| 2007/0180409 A1* | 8/2007 | Sohn et al. | 715/863 |
| 2008/0211780 A1* | 9/2008 | Bell et al. | 345/173 |
| 2008/0224962 A1* | 9/2008 | Kasai et al. | 345/76 |
| 2009/0197635 A1* | 8/2009 | Kim et al. | 455/550.1 |
| 2009/0213081 A1* | 8/2009 | Case, Jr. | 345/173 |
| 2010/0007518 A1* | 1/2010 | Kang et al. | 340/825.72 |
| 2010/0066677 A1* | 3/2010 | Garrett et al. | 345/163 |
| 2010/0127979 A1* | 5/2010 | Lee et al. | 345/158 |
| 2010/0201615 A1* | 8/2010 | Tupman et al. | 345/156 |
| 2010/0238109 A1* | 9/2010 | Cook et al. | 345/156 |
| 2010/0253619 A1* | 10/2010 | Ahn | 345/157 |
| 2010/0315336 A1* | 12/2010 | Butler et al. | 345/158 |
| 2011/0007018 A1 | 1/2011 | McKinley et al. | |
| 2012/0075196 A1* | 3/2012 | Ashbrook et al. | 345/173 |
| 2014/0289677 A1 | 9/2014 | Goto et al. | |

FOREIGN PATENT DOCUMENTS

| | | |
|---|---|---|
| EP | 2 144 142 A2 | 1/2010 |
| WO | WO 2009/038596 A1 | 3/2009 |

* cited by examiner

FIG.6
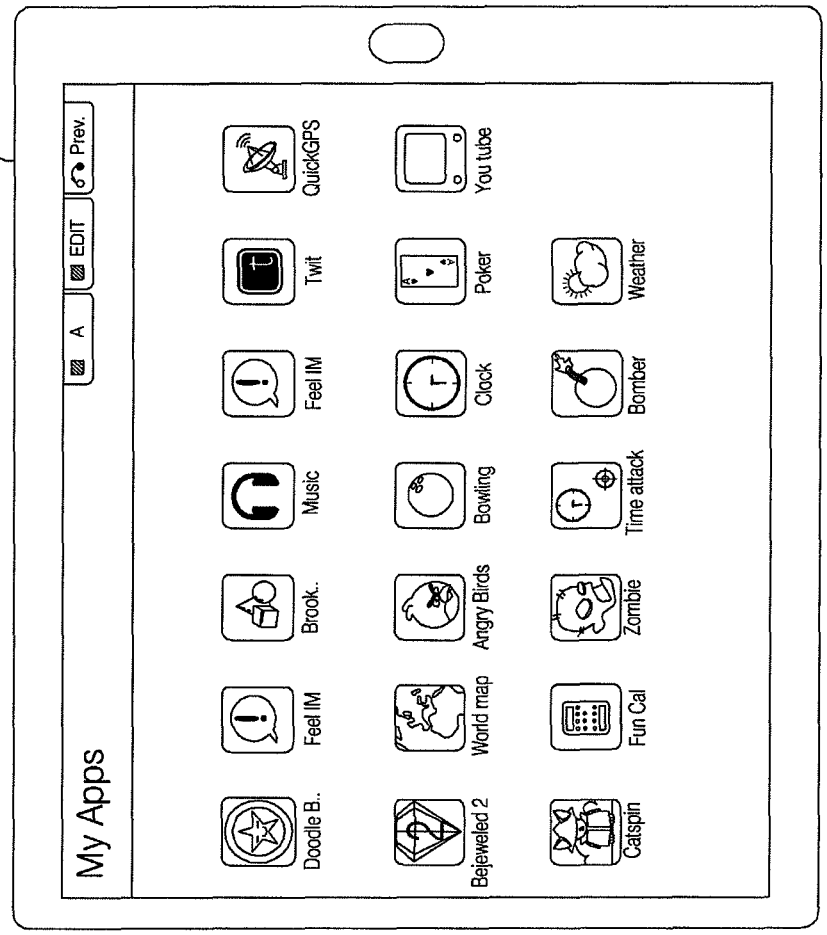
(b)
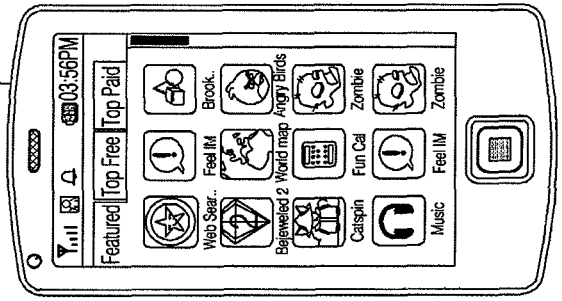
(a)

REMOTE CONTROLLER AND IMAGE DISPLAY APPARATUS CONTROLLABLE BY REMOTE CONTROLLER

CROSS-REFERENCE TO RELATED APPLICATION

This application claims the benefit of Korean Patent Application No. 10-2011-0070968, filed on Jul. 18, 2011 in the Korean Intellectual Property Office, and the priority benefit of U.S. Provisional Application No. 61/481,920 filed on May 3, 2011 in the USPTO. The entire contents of each of these applications are incorporated herein by reference.

BACKGROUND OF THE INVENTION

1. Field of the Invention

The present invention relates to a remote controller and an image display apparatus controllable by the remote controller, and more particularly, to a remote controller for providing a plurality of control modes and an image display apparatus controllable by the remote controller.

2. Description of the Related Art

An image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

A remote controller is a device capable of remotely controlling an image display apparatus. The remote controller transmits a signal carrying a command corresponding to a user manipulation to the image display apparatus and thus the operation of the image display apparatus is controlled according to the command carried in the received signal.

Meanwhile, a portable terminal provides various, convenient User Interface (UI) environments such as a menu screen, a touch screen that enables a user to enter characters by touches, etc.

SUMMARY OF THE INVENTION

Therefore, the present invention has been made in view of the above problems, and it is an object of the present invention to provide a remote controller and an image display apparatus, which can increase user convenience.

It is another object of the present invention to provide a remote controller for providing a plurality of modes to enable a user to readily use an image display apparatus and a User Interface (UI) applicable to the image display apparatus.

In accordance with an aspect of the present invention, the above and other objects can be accomplished by the provision of an image display apparatus controllable by a remote controller, including a display, an interface for receiving from the remote controller a signal based on a motion of the remote controller or a signal based on a touch input on the remote controller, and a controller for operating the image display apparatus in motion mode to control the image display apparatus according to the motion of the remote controller, if the degree of the motion is equal to or larger than a reference value and operating the image display apparatus in touch mode to control the image display apparatus according to the touch input on the remote controller, if the degree of the motion is smaller than the reference value.

In accordance with another aspect of the present invention, there is provided an image display apparatus controllable by a remote controller, including a display, an interface for receiving from the remote controller a signal based on a motion of the remote controller or a signal based on a touch input on the remote controller, and a controller for operating the image display apparatus in motion mode to control the image display apparatus according to the motion of the remote controller, in the absence of the touch input and operating the image display apparatus in touch mode to control the image display apparatus according to the touch input on the remote controller, in the presence of the touch input.

In accordance with a further aspect of the present invention, there is provided a remote controller for controlling an image display apparatus, including a touch screen for displaying a user interface to input a control command for the image display apparatus, a communication module for transmitting a signal carrying a control command to the image display apparatus, and a controller for controlling the touch screen and the communication module to transmit a control command corresponding to a motion of the remote controller or a touch input on the touch screen to the image display apparatus.

BRIEF DESCRIPTION OF THE DRAWINGS

The above and other objects, features and other advantages of the present invention will be more clearly understood from the following detailed description taken in conjunction with the accompanying drawings, in which:

FIG. 6 illustrates exemplary portable terminals according to an embodiment of the present invention.

DETAILED DESCRIPTION OF THE PREFERRED EMBODIMENTS

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

An image display apparatus as set forth herein is an intelligent image display apparatus having a broadcasting reception function and a computer-supporting function in combination. Owing to an Internet function added to the broadcasting reception function, the image display apparatus can provide user-friendly interfaces such as a handwriting input device, a touch screen, or a pointing device. As the image display apparatus can access the Internet and can be connected to a computer through the wired or wireless Internet function, it can perform functions including e-mail, Web browsing, banking, or game play. To support such various functions, the image display apparatus may operate based on a standardized general-purpose Operating System (OS).

As a number of applications can be freely added to or removed from a general-purpose OS kernel in the image display apparatus, the image display apparatus can perform a variety of user-friendly functions. For example, the image display apparatus may be a smart TV.

Figure 1:
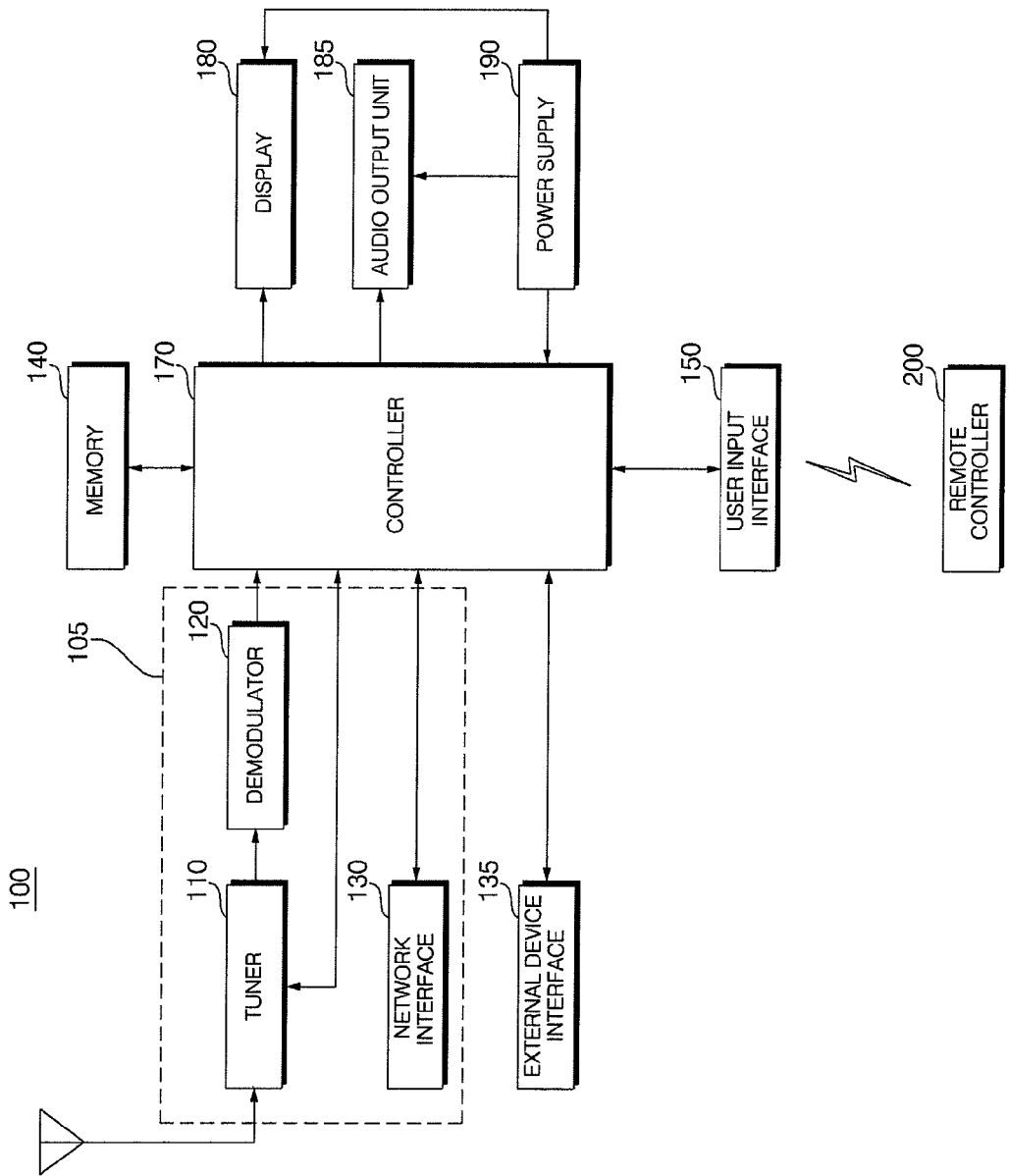
FIG. 1 is a block diagram of an image display apparatus according to an embodiment of the present invention.

FIG. 1 is a block diagram of an image display apparatus according to an embodiment of the present invention.

Referring to FIG. 1, an image display apparatus 100 according to an embodiment of the present invention includes a broadcasting receiver 105, an external device interface 135, a memory 140, a user input interface 150, a controller 170, a display 180, an audio output unit 185, and a power supply 190. The broadcasting receiver 105 may include a tuner 110, a demodulator 120, and a network interface 130. As needed, the broadcasting receiver 105 may be configured so as to include only the tuner 110 and the demodulator 120 or only the network interface 130.

The tuner 110 selects a Radio Frequency (RF) broadcast signal corresponding to a channel selected by a user or an RF broadcast signal corresponding to each of pre-stored channels from among a plurality of RF broadcast signals received through an antenna and downconverts the selected RF broadcast signal into a digital Intermediate Frequency (IF) signal or an analog baseband Audio/Video (A/V) signal.

More specifically, if the selected RF broadcast signal is a digital broadcast signal, the tuner 110 downconverts the selected RF broadcast signal into a digital IF signal, DIF. On the other hand, if the selected RF broadcast signal is an analog broadcast signal, the tuner 110 downconverts the selected RF broadcast signal into an analog baseband A/V signal, CVBS/SIF. That is, the tuner 110 may be a hybrid tuner capable of processing not only digital broadcast signals but also analog broadcast signals. The analog baseband A/V signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially select a number of RF broadcast signals corresponding to all broadcast channels previously stored in the image display apparatus 100 by a channel add function from a plurality of RF signals received through the antenna and may downconvert the selected RF broadcast signals into IF signals or baseband A/V signals.

The demodulator 120 receives the digital IF signal DIF from the tuner 110 and demodulates the digital IF signal DIF.

For example, if the digital IF signal DIF is an ATSC signal, the demodulator 120 may perform 8-Vestigal SideBand (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF, thereby obtaining a stream signal TS. The stream signal TS may be a signal in which a video signal, an audio signal and a data signal are multiplexed. For example, the stream signal TS may be an MPEG-2 TS in which an MPEG-2 video signal and a Dolby AC-3 audio signal are multiplexed. An MPEG-2 TS may include a 4-byte header and 184-byte payload.

In order to properly handle not only ATSC signals but also DVB signals, the demodulator 120 may include an ATSC demodulator and a DVB demodulator.

The stream signal TS may be input to the controller 170 and thus subjected to demultiplexing and A/V signal processing. The processed video and audio signals are output to the display 180 and the audio output unit 185, respectively.

The external device interface 135 may serve as an interface between an external device and the image display apparatus 100. For interfacing, the external device interface 135 may include an A/V Input/Output (I/O) unit (not shown) and/or a wireless communication module (not shown).

The external device interface 135 may be connected to an external device such as a Digital Versatile Disk (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video and data signals from or to the external device, the external device interface 135 includes the A/V I/O unit (not shown) and/or the wireless communication module (not shown).

The A/V I/O unit of the external device interface 135 may include a Universal Serial Bus (USB) port, a Composite Video Banking Sync (CUBS) port, a Component port, a Super-video (S-video) (analog) port, a Digital Visual Interface (DVI) port, a High-Definition Multimedia Interface (HDMI) port, a Red-Green-Blue (RGB) port, and a D-sub port.

The wireless communication module of the external device interface 135 may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA).

The external device interface 135 may be connected to various set-top boxes through at least one of the above-described ports and may thus receive data from or transmit data to the various set-top boxes.

The external device interface 135 may receive applications or an application list from an adjacent external device and provide the applications or the application list to the controller 170 or the memory 140.

The network interface 130 serves as an interface between the image display apparatus 100 and a wired/wireless network such as the Internet. The network interface 130 may include an Ethernet port for connection to a wired network. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 130 may access a specific Web page over a connected network or another network linked to the connected network. That is, the network interface 130 may access a specific Web page over a network and transmit or receive data to or from a server. Additionally, the network interface 130 may receive content or data from a Content Provider (CP) or a Network Provider (NP). Specifically, the network interface 130 may receive content such as movies, advertisements, games, Video on Demand (VoD) files, and broadcast signals, and information related to the content from a CP or an NP. Also, the network interface 130 may receive update information about firmware and update files of the firmware from the NP. The network interface 130 may transmit data over the Internet or to the CP or the NP.

The network interface 130 may selectively receive a desired application among open applications over a network.

The memory 140 may store various programs necessary for the controller 170 to process and control signals, and may also store processed a video, audio and/or data signal.

The memory 140 may temporarily store a video, audio and/or data signal received from the external device interface 135 or the network interface 130. The memory 140 may store information about broadcast channels by the channel-add function.

The memory 140 may store applications or a list of applications received from the external device interface 135 or the network interface 130.

The memory 140 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), or a Read-Only Memory (ROM) such as an Electrically Erasable and Programmable Read Only Memory (EEPROM). The image display apparatus 100 may reproduce content stored in the memory 140 (e.g. video files, still image files, music files, text files, and application files) to the user.

While the memory 140 is shown in FIG. 1 as configured separately from the controller 170, to which the present invention is not limited, the memory 140 may be incorporated into the controller 170, for example.

The user input interface 150 transmits a signal received from the user to the controller 170 or transmits a signal received from the controller 170 to the user.

For example, the user input interface 150 may receive various user input signals such as a power-on/off signal, a channel selection signal, and a screen setting signal from a remote controller 200 or may transmit a signal received from the controller 170 to the remote controller 200, according to various communication schemes, for example, RF communication, IR communication, etc.

For example, the user input interface 150 may provide the controller 170 with user input signals or control signals received from local keys (not shown), such as inputs of a power key, a channel key, and a volume key, and setting values.

Also, the user input interface 150 may transmit a control signal received from a sensor unit (not shown) for sensing a user gesture to the controller 170 or transmit a signal received from the controller 170 to the sensor unit. The sensor unit may include a touch sensor, a voice sensor, a position sensor, a motion sensor, etc.

The controller 170 may demultiplex the stream signal TS received from the tuner 110, the demodulator 120, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135.

The audio signal processed by the controller 170 may be output to the audio output unit 185. Also, the audio signal processed by the controller 170 may be transmitted to the external output device through the external device interface 135.

While not shown in FIG. 1, the controller 170 may include a DEMUX and a video processor, which will be described later with reference to FIG. 2.

In addition, the controller 170 may provide overall control to the image display apparatus 100. For example, the controller 170 may control the tuner 110 to select an RF broadcast signal corresponding to a user-selected channel or a pre-stored channel.

The controller 170 may control the image display apparatus 100 according to a user command received through the user input interface 150 or according to an internal program. Especially the controller 170 may access a network and download an application or application list selected by the user to the image display apparatus 100 over the network.

For example, the controller 170 controls the tuner 110 to receive a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185.

In another example, the controller 170 outputs a video or audio signal received from an external device such as a camera or a camcorder through the external device interface 135 to the display 180 or the audio output unit 185 according to an external device video playback command received through the user input interface 150.

The controller 170 may control the display 180 to display images. For instance, the controller 170 may control the display 180 to display a broadcast image received from the tuner 110, an external input image received through the external device interface 135, an image received through the network interface 130, or an image stored in the memory 140. The image displayed on the display 180 may be a Two-Dimensional (2D) or Three-Dimensional (3D) still image or video.

Upon selection of an application view menu item, the controller 170 may control display of applications or a list of applications that are available in the image display apparatus or downloadable from an external network.

The controller 170 may control installation and execution of an application downloaded from the external network along with various User Interfaces (UIs). Also, the controller 170 may control display of an image related to the executed application on the display 180, upon user selection.

Upon receipt of a search keyword related to a displayed image, the controller 170 controls display of collected information matching to the search keyword on the display 180. Upon receipt of a zoom-in or zoom-out input from the remote controller 200, the controller 170 controls display of zoomed-in or zoomed-out information corresponding to the zoom-in or zoom-out input on the display 180. The zoom-in or zoom-out input may be generated by moving the remote controller 200 nearer to the display 180 or farther from the display 180.

If the displayed image is a video, upon receipt of the search keyword, the controller 170 may discontinue play of the video. Herein, an object indicating image reproduction may be displayed on the display 180.

To help the user to enter a search keyword, the controller 170 may control display of a keyboard on the display 180. Upon selection of a letter from the keyboard by the user, the controller 170 may control input of the letter.

Upon selection of a button corresponding to a specific letter in the image display apparatus 100, the controller 170 may control input of the letter according to an input signal corresponding to the button selection.

Upon selection of a part of a displayed image by the user, the controller 170 may control input of a search keyword corresponding to an image within the selected part. For example, the controller 170 may search for the image within the selected part in the image display apparatus 100 or the network, collect information about the detected image or similar images, and derive a search keyword based on the collected information. Alternatively or additionally, the controller 170 may derive a search keyword using related information included in metadata added to the image within the selected part.

The controller 170 may control display of a plurality of items corresponding to search results in an area of the display 180 and display of information about an item selected from among the displayed items in another area of the display 180. These items may be classified into music, video, Web, map, applications, etc. The items may be added or deleted according to user settings and may be reordered according to their priority levels.

For example, upon selection of an application item, the controller 170 may control display of information about applications available in the image display apparatus 100 or information about applications downloadable from an external network.

Along with a variety of UIs, the controller 170 may control installation and execution of an application downloaded from the external network and display of an image related to the executed application on the display 180.

The controller 170 may control display of an input window in which the user may enter a search keyword. The input window may be displayed in an area other than an image displayed on the display 180 or overlaid on the displayed image.

Upon receipt of an exit input for displayed information or an exit input for a displayed zoomed-in or zoomed-out image, the controller 170 may control display of a previously displayed image on the display 180. Herein, an object indicating image reproduction may be displayed on the display 180.

The image display apparatus 100 may further include a channel browsing processor (not shown) for generating thumbnail images corresponding to channel signals or external input signals. The channel browsing processor may extract some of the video frames of each of stream signals TS received from the demodulator 120 or stream signals received from the external device interface 135 and display the extracted video frames on the display 180 as thumbnail images. The thumbnail images may be directly output to the controller 170 or may be output after being encoded. Also, it is possible to encode the thumbnail images into a stream and output the stream to the controller 170. The controller 170 may display a thumbnail list including a plurality of received thumbnail images on the display 180. The thumbnail images may be updated sequentially or simultaneously in the thumbnail list. Therefore, the user can readily identify the content of broadcast programs received through a plurality of channels.

The display 180 may convert a processed video signal, a processed data signal, and an OSD signal received from the controller 170 or a video signal and a data signal received from the external device interface 135 into RGB signals, thereby generating driving signals.

The display 180 may be various types of displays such as a Plasma Display Panel (PDP), a Liquid Crystal Display (LCD), an Organic Light-Emitting Diode (OLED) display, a flexible display, and a 3D display.

The display 180 may also be a touch screen that can be used not only as an output device but also as an input device.

The audio output unit 185 may receive a processed audio signal (e.g., a stereo signal, a 3.1-channel signal or a 5.1-channel signal) from the controller 170 and output the received audio signal as sound. The audio output unit 185 may employ various speaker configurations.

The image display apparatus 100 may further include a camera unit (not shown) for capturing images of a user. While the camera unit may include a single camera, to which the present invention is not limited, it may include a plurality of cameras. Image information captured by the camera unit is input to the controller 170.

To sense a user gesture, the image display apparatus 100 may further include the sensor unit (not shown) that has at least one of a touch sensor, a voice sensor, a position sensor, and a motion sensor, as stated before. A signal sensed by the sensor unit may be output to the controller 170 through the user input interface 150.

The controller 170 may sense a user gesture from an image captured by the camera unit or a signal sensed by the sensor unit, or by combining the captured image with the sensed signal.

Meanwhile, an operation of the remote controller 200 or a portable terminal may be sensed by means of a detector such as the camera unit or the sensor unit.

The power supply 190 supplies power to the image display apparatus 100. Particularly, the power supply 190 may supply power to the controller 170, the display 180, and the audio output unit 185, which may be implemented into a System On Chip (SOC).

For supplying power, the power supply 190 may include a converter (not shown) for converting Alternating Current (AC) into Direct Current (DC). If the display 180 is configured with, for example, a liquid crystal panel having a plurality of backlight lamps, the power supply 190 may further include an inverter (not shown) capable of performing Pulse Width Modulation (PWM) for luminance change or dimming driving.

The remote controller 200 transmits a user input to the user input interface 150. For transmission of user input, the remote controller 200 may use various communication techniques such as Bluetooth, RF communication, IR communication, UWB and ZigBee.

In addition, the remote controller 200 may receive a video signal, an audio signal or a data signal from the user input interface 150 and output the received signals visually, audibly or as vibrations.

The above-described image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs.

The image display apparatus described in the specification may be a wireless type without the display 180 and the audio output unit 185 illustrated in FIG. 1, which transmits data to and receives data from the display 180 and the audio output unit 185 wirelessly.

The block diagram of the image display apparatus 100 illustrated in FIG. 1 is purely exemplary. Depending upon the specification of the image display apparatus 100 in actual implementation, the components of the image display apparatus 100 may be combined or omitted or new components may be added. That is, two or more components are incorporated into one component or one component may be configured as separate components, as needed. In addition, the function of each block is described for the purpose of describing the embodiment of the present invention and thus specific operations or devices should not be construed as limiting the scope and spirit of the present invention.

Unlike the configuration illustrated in FIG. 1, the image display apparatus 100 may be configured so as to receive and play video content through the network interface 130 or the external device interface 135, without the tuner 100 and the demodulator 120.

The image display apparatus 100 is an example of image signal processing apparatus that processes a stored image or an input image. Other examples of the image signal processing apparatus include a set-top box without the display 180 and the audio output unit 185, a DVD player, a Blu-ray player, a game console, and a computer.

Figure 2:
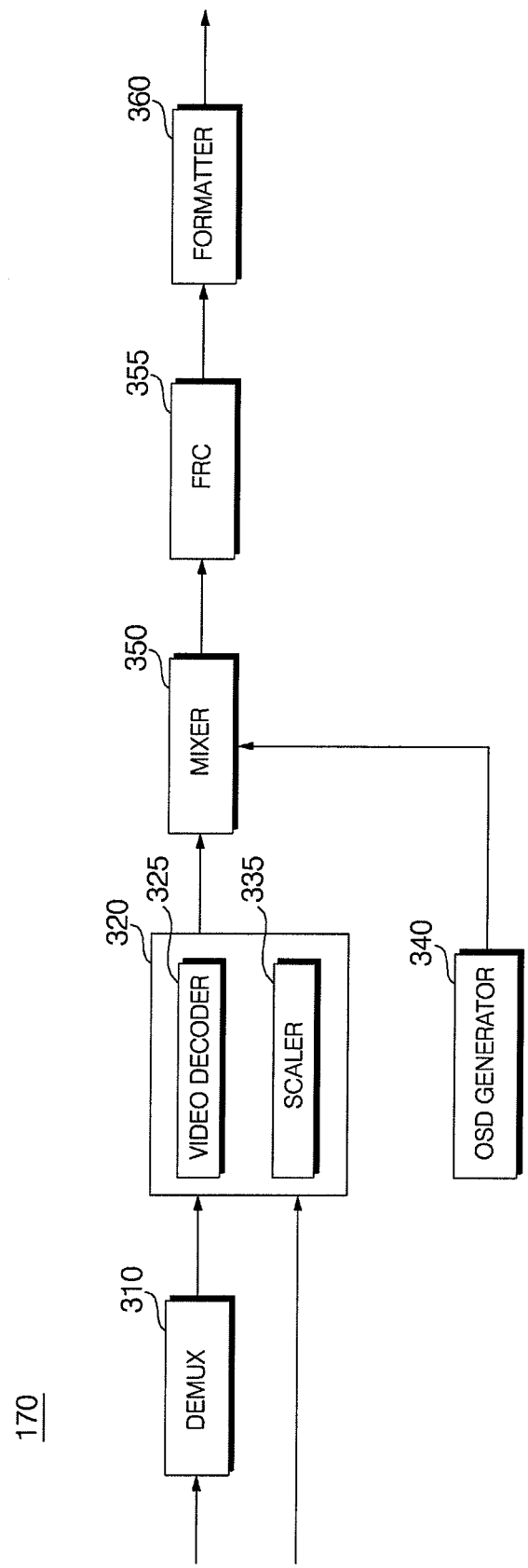
FIG. 2 is a block diagram of a controller illustrated in FIG. 1.

FIG. 2 is a block diagram of the controller illustrated in FIG. 1.

Referring to FIG. 2, the controller 170 may include a DEMUX 310, a video processor 320, an OSD generator 340, a mixer 350, a Frame Rate Converter (FRC) 355, and a formatter 360 according to an embodiment of the present invention. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The input stream signal may be received from the tuner 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate based on various standards.

For example, if the video signal is an MPEG-2 encoded signal, an MPEG-2 decoder may decode the video signal.

On the other hand, if the video signal is an H.264-encoded DMB or DVB-handheld (DVB-H) signal, a H.264 decoder 325 may decode the video signal.

The video signal decoded by the video processor 320 is provided to the mixer 350.

The OSD generator 340 generates an OSD signal autonomously or according to a user input. For example, the OSD generator 340 may generate signals by which a variety of information is displayed as graphics or text on the display 180, according to user input signals. The OSD signal may include various data such as a UI, a variety of menus, widgets, icons, etc.

For example, the OSD generator 340 may generate a signal by which captions are displayed for a broadcast image or Electronic Program Guide (EPG)-based broadcasting information.

The mixer 350 may mix the decoded video signal with the OSD signal and output the mixed signal to the formatter 360. As the decoded broadcast video signal or the external input signal is mixed with the OSD signal, an OSD may be overlaid on the broadcast image or the external input image.

The FRC 355 may change the frame rate of an input image. For example, a frame rate of 60 Hz is converted into a frame rate of 120 or 240 Hz. When the frame rate is to be changed from 60 Hz to 120 Hz, a first frame is inserted between the first frame and a second frame, or a predicted third frame is inserted between the first and second frames. If the frame rate is to be changed from 60 Hz to 240 Hz, three identical frames or three predicted frames are inserted between the first and second frames. It is also possible to maintain the frame rate of the input image without frame rate conversion.

The formatter 360 changes the format of the signal received from the FRC 355 to be suitable for the display 180. For example, the formatter 360 may convert a received signal into an RGB data signal. The RGB signal may be output in the form of a Low Voltage Differential Signal (LVDS) or mini-LVDS.

The audio processor (not shown) of the controller 170 may process the demultiplexed audio signal. For audio signal processing, the audio processor may have a plurality of decoders.

If the demultiplexed audio signal is a coded audio signal, the audio processor of the controller 170 may decode the audio signal. For example, the demultiplexed audio signal may be decoded by an MPEG-2 decoder, an MPEG-4 decoder, an Advanced Audio Coding (AAC) decoder, or an AC-3 decoder.

The audio processor of the controller 170 may also adjust the bass, treble or volume of the audio signal.

The data processor (not shown) of the controller 170 may process the data signal obtained by demultiplexing the input stream signal. For example, if the data signal is an encoded signal such as an EPG which includes broadcasting information specifying the start time, end time, etc. of scheduled broadcast TV or radio programs, the controller 170 may decode the data signal. Examples of an EPG include ATSC-Program and System Information Protocol (PSIP) information and DVB-Service Information (SI). ATSC-PSIP information or DVB-SI may be included in the header of a TS, i.e., a 4-byte header of an MPEG-2 TS.

The block diagram of the controller 170 illustrated in FIG. 2 is an embodiment of the present invention. Depending upon the specifications of the controller 170, the components of the controller 170 may be combined, or omitted. Or new components are added to the controller 170.

Figure 3:
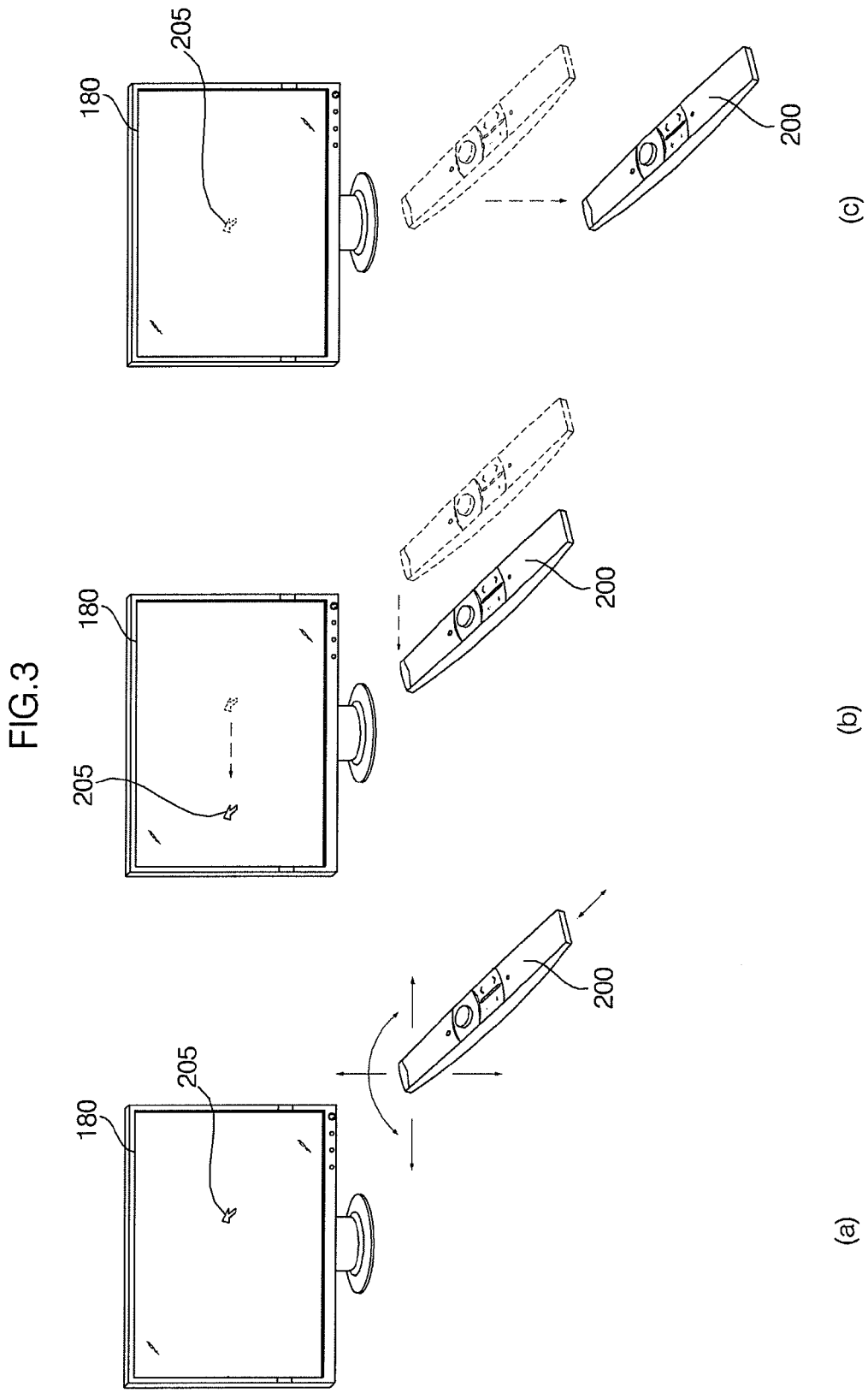
FIG. 3 illustrates operations of a remote controller illustrated in FIG. 1.

FIG. 3 illustrates operations of the remote controller illustrated in FIG. 1.

Referring to FIG. 3, the remote controller 200 may transmit signals to and receive signals from the image display apparatus in conformance to an RF or IR communication standard.

FIG. 3(a) illustrates a pointer 205 representing movement of the remote controller 200 displayed on the display 180.

The user may move or rotate the remote controller 200 up and down, side to side (FIG. 3(b)), and back and forth (FIG. 3(c)). Since the pointer 205 moves in accordance with the movement of the remote controller 200, the remote controller 200 may be referred to as a pointing device.

Referring to FIG. 3(b), if the user moves the remote controller 200 to the left, the pointer 205 moves to the left on the display 180. A sensor of the remote controller 200 detects the movement of the remote controller 200 and transmits motion information corresponding to the result of the detection to the image display apparatus. Then, the image display apparatus determines the movement of the remote controller 200 based on the motion information received from the remote controller 200, and calculates the coordinates of a target point to which the pointer 205 should be shifted in accordance with the movement of the remote controller 200 based on the result of the determination. The image display apparatus then displays the pointer 205 at the calculated coordinates.

Referring to FIG. 3(c), while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. The opposite case is possible. That is, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

In the specification, a pointer is an object displayed on the display 180 in correspondence with an operation of the remote controller 200. Accordingly, the pointer 205 may be represented as objects in various forms including an arrow illustrated in FIG. 3. For example, the pointer 205 may be shaped into a spot, a cursor, a prompt, or a bold outline. In addition, the pointer 205 may be displayed at a plurality of points such as a line, surface, etc. as well as at one point along the horizontal and vertical axes of the display 180.

Figure 4A:
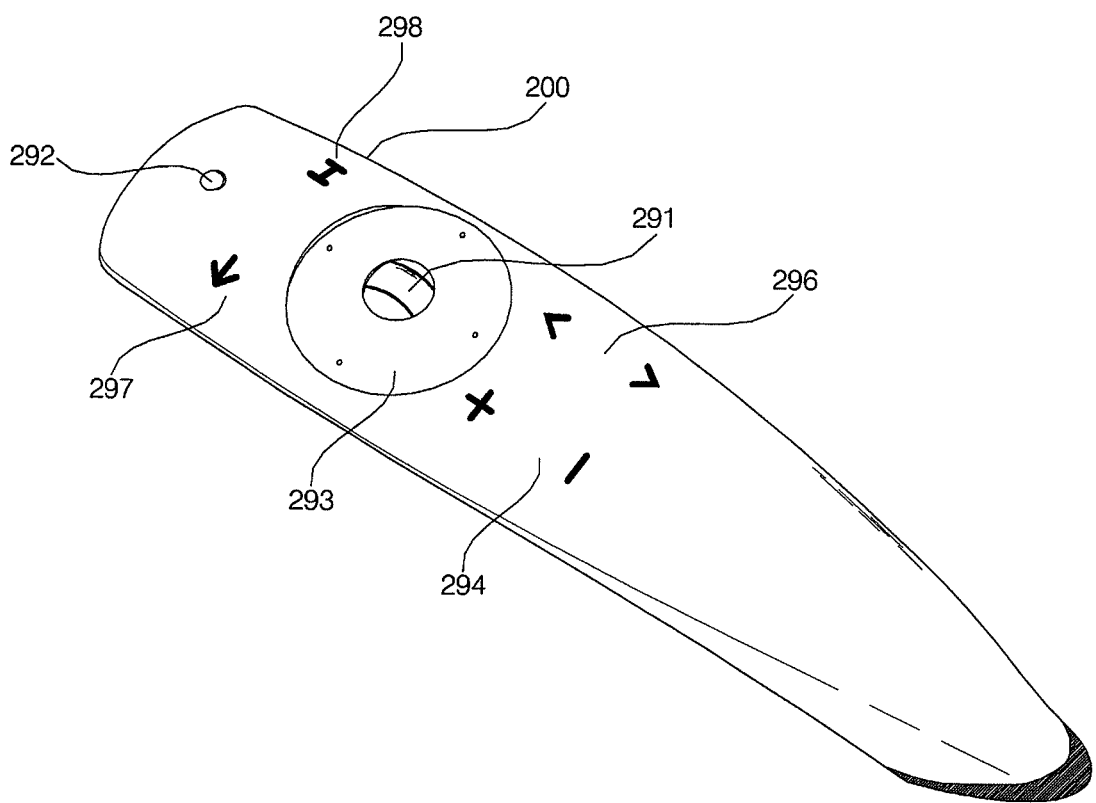
FIG. 4A is a perspective view of a remote controller according to an embodiment of the present invention.

FIG. 4A is a perspective view of the remote controller, for example, a pointing device according to an embodiment of the present invention.

Referring to FIG. 4A, the pointing device may include a plurality of input keys or buttons.

For example, the pointing device may include an OK key 291, a Menu key 292, a 4-directional key 293, a Channel key 294, and a Volume key 296.

For example, the OK key 291 may be used to select a menu or an item. The Menu key 292 may be used to display a specific menu and the 4-directional key 293 may be used to move a pointer or an indicator up, down, to the left, or to the right. With the Channel key 294, a user may increase or decrease a channel number. The Volume key 296 may be used to increase or decrease sound volume.

The pointing device may further include a Back key 297 and a Home key 298. For example, a previous screen may appear by pressing the Back key 297. The Home key 298 may take the user to a home screen.

As illustrated in FIG. 4A, the OK key 291 may be equipped with a scroll function. Thus, the OK key 291 may be configured into a wheel key. When the OK key 291 is pressed, a menu or item may be selected. If the OK key 291 is scrolled up or down, a displayed screen may be scrolled up or down or a page may be turned to a previous or next page.

Specifically, when a part of an image is displayed on the display 180 because the image is too large for the display size of the display 180, another part of the image may be displayed on the display 180 by scrolling the OK key 291. In another example, when a list page is displayed on the display 180, the list page may be turned to the previous or next page by scrolling the OK key 291.

The scroll function may be implemented by a separately procured key instead of the OK key 291.

The 4-directional key 293 may be configured into a ring with up, down, left and right keys arranged at four directional positions. For example, when a user touches from the up key to the down key, a predetermined function set for the touch input may be input or performed.

In an alternative embodiment, the pointing device may further include a touch screen to receive touch inputs.

Figure 4B:
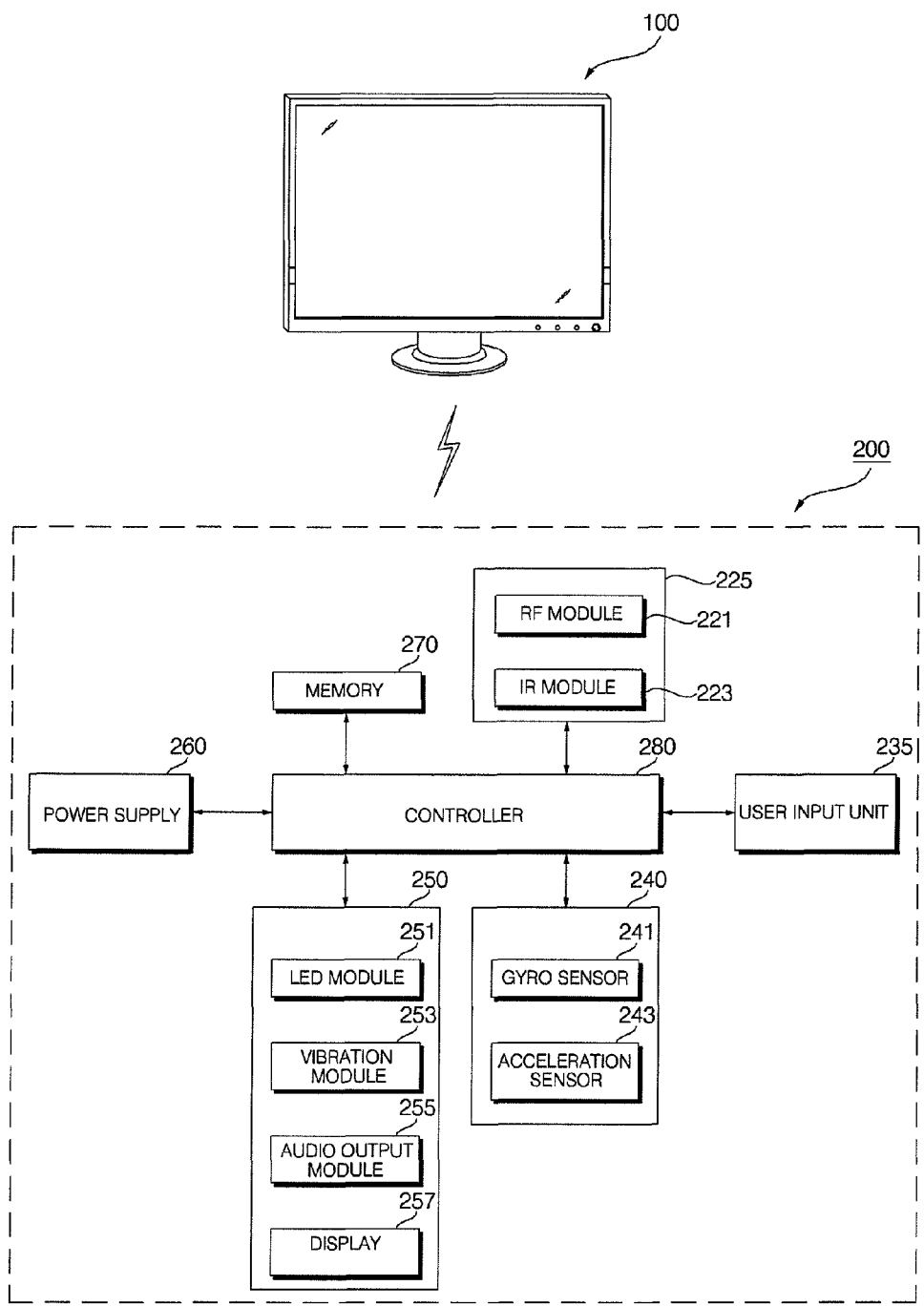
FIG. 4B is a block diagram of the remote controller according to an embodiment of the present invention.

FIG. 4B is a block diagram of the remote controller illustrated in FIG. 1.

Referring to FIG. 4B, the remote controller 200 may include a wireless communication module 225, a user input unit 235, a sensor unit 240, an output unit 250, a power supply 260, a memory 270, and a controller 280.

The wireless communication module 225 transmits signals to and/or receives signals from the image display apparatus 100. In the embodiment of the present invention, the wireless communication module 225 may include an RF module 221 for transmitting RF signals to and/or receiving RF signals from the image display apparatus 100 according to an RF communication standard. The wireless communication module 225 may also include an IR module 223 for transmitting IR signals to and/or receiving IR signals from the image display apparatus 100 according to an IR communication standard.

In the embodiment of the present invention, the remote controller 200 transmits motion information regarding the movement of the remote controller 200 to the image display apparatus 100 through the RF module 221. The remote controller 200 may also receive signals from the image display apparatus 100 through the RF module 221. The remote controller 200 may transmit commands, such as a power on/off command, a channel switching command, or a sound volume change command, to the image display apparatus 100 through the IR module 223, as needed.

The user input unit 235 may include a keypad, a plurality of buttons, a touch pad, and/or a touch screen. The user may enter commands to the image display apparatus 100 by manipulating the user input unit 235. If the user input unit 235 includes a plurality of hard-key buttons, the user may input various commands to the image display apparatus 100 by pressing the hard-key buttons. Alternatively or additionally, if the user input unit 235 includes a touch pad or a touch screen, the user may input various commands to the image display apparatus 100 by touching the touch pad or the touch screen. The user input unit 235 may also include various input tools other than those set forth herein, such as a scroll key and/or a jog key, which should not be construed as limiting the present invention.

The sensor unit 240 may include a gyro sensor 241 and/or an acceleration sensor 243. The gyro sensor 241 may sense the movement of the remote controller 200, for example, in X-, Y-, and Z-axis directions, and the acceleration sensor 243 may sense the moving speed of the remote controller 200. The sensor unit 240 may further include a distance sensor for sensing the distance between the remote controller 200 and the display 180.

The output unit 250 may output a video and/or audio signal corresponding to a manipulation of the user input unit 235 or a signal transmitted by the image display apparatus 100. The user may easily identify whether the user input unit 235 has been manipulated or whether the image display apparatus 100 has been controlled based on the video and/or audio signal output by the output unit 250.

For example, the output unit 250 may include a Light Emitting Diode (LED) module 251 which is turned on or off whenever the user input unit 230 is manipulated or whenever a signal is received from or transmitted to the image display apparatus 100 through the wireless communication module 220, a vibration module 253 which generates vibrations, an audio output module 255 which outputs audio data, and a display module 257 which outputs an image.

The power supply 260 supplies power to the remote controller 200. If the remote controller 200 is kept stationary for a predetermined time or longer, the power supply 260 may, for example, reduce or cut off supply of power to the remote controller 801 in order to save power. The power supply 260 may resume supply of power if a specific key on the remote controller 200 is manipulated.

The memory 270 may store various application data for controlling or operating the remote controller 200. The remote controller 200 may wirelessly transmit signals to and/or receive signals from the image display apparatus 100 in a predetermined frequency band through the RF module 221. The controller 280 of the remote controller 200 may store information regarding the frequency band used for the remote controller 200 to wirelessly transmit signals to and/or wirelessly receive signals from the paired image display apparatus 100 in the memory 270 and may then refer to this information for use at a later time.

The controller 280 provides overall control to the remote controller 200. For example, the controller 280 may transmit a signal corresponding to a key manipulation detected from the user input unit 235 or a signal corresponding to motion of the remote controller 200, as sensed by the sensor unit 240, to the image display apparatus 100 through the wireless communication module 225.

Figure 5:
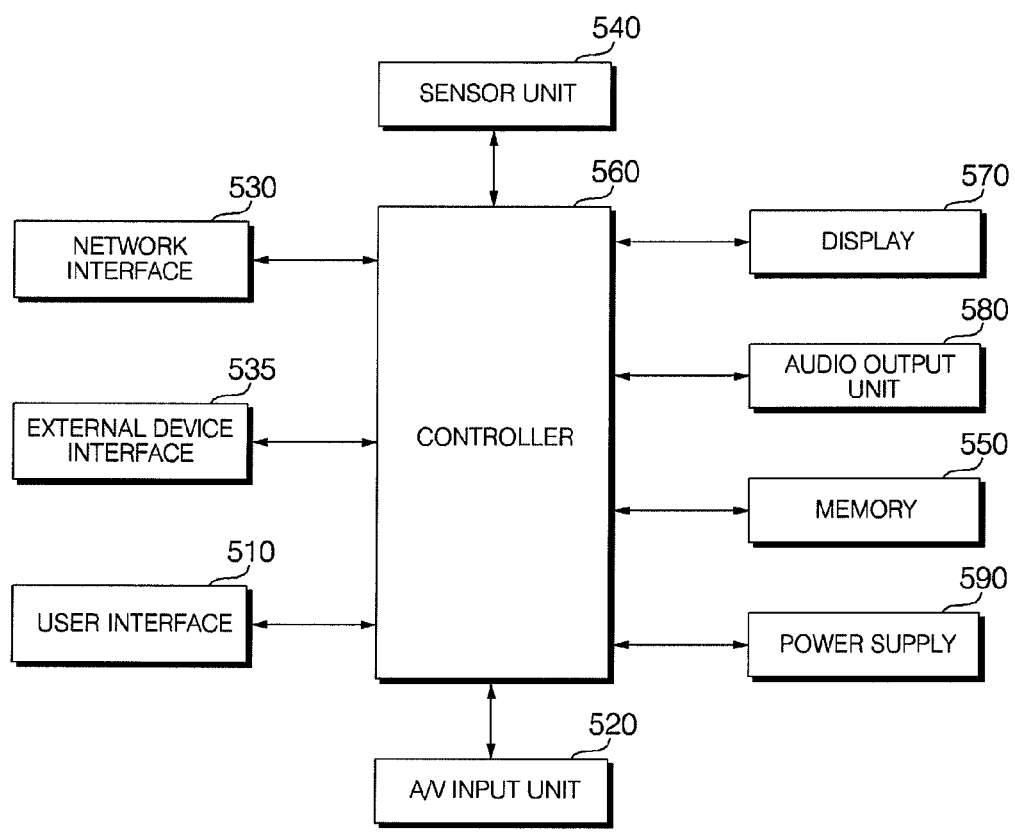
FIG. 5 is a block diagram of a portable terminal according to an embodiment of the present invention.

FIG. 5 is a block diagram of a portable terminal according to an embodiment of the present invention and FIG. 6 illustrates exemplary portable terminals.

Referring to FIG. 5, a portable terminal 500 may include a user interface 510, an A/V input unit 520, a network interface 530, an external device interface 535, a sensor unit 540, a memory 550, a controller 560, a display 570, an audio output unit 580, and a power supply 590. Two or more components of the portable terminal 500 may be combined into a single component or a single component thereof may be separated into two or more components in alternative embodiments.

The portable terminal 500 according to the embodiment of the present invention is shown as a smart phone in FIG. 6(a) and as a tablet PC in FIG. 6(b).

The term "portable terminal" as used herein covers a broad range of terminals including a tablet computer, a portable phone, a smart phone, a laptop computer, a Personal Digital Assistant (PDA), a Portable Multimedia Player (PMP), a digital broadcasting terminal, a navigator, etc.

The portable terminal is capable of accessing the Internet and a computer by wireless or wired Internet and thus performing functions such as e-mail, Web browsing, banking, game playing. Obviously, the portable terminal also has voice call and video call functions over the Internet based on Voice over Internet Protocol (VoIP) and a mobile communication network.

The user interface 510 generates key input data that the user inputs to control the operation of the portable terminal 500. The user interface 510 may include a keypad, a dome switch, a (resistive/capacitive) touch pad, etc. to receive a command or information through the user's push or touch manipulation. The user interface 510 may also be configured into a jog wheel that is rotated for a key input, a finger mouse, etc. Or the user interface 510 may be manipulated in a jog or joy stick fashion.

The A/V input unit 520 is used to receive an audio signal or a video signal and may include a camera and a microphone. The camera processes video frames including a still image or a video acquired from an image sensor in video call mode or camera mode. The processed video frames may be displayed on the display 570.

The video frames processed by the camera may be stored in the memory 550 or transmitted externally through the network interface 530 or the external device interface 535. Two or more cameras may be provided to the portable terminal 500 depending on the configuration specification of the portable terminal 500.

The microphone receives an external audio signal and processes the audio signal to electrical voice data in call mode, recording mode, or voice recognition mode.

The network interface 530 interfaces between the portable terminal 500 and a wired/wireless network including the Internet.

The network interface 530 may transmit data to or receive data from another user or another electronic device over a connected network or another network linked to the connected network. Especially, the network interface 530 may transmit some content data stored in the portable terminal 500 to a user or electronic device selected from among other users or electronic devices pre-registered to the portable terminal 500.

The network interface 530 may access a specific Web page through a connected network or another network linked to the connected network. That is, the network interface 530 may transmit data to or receive data from a server by accessing a specific Web page through a network. Additionally, the network interface 530 may receive content or data from a CP or an NP. Specifically, the network interface 530 may receive content such as movies, advertisements, games, VoD files, and broadcast signals, and information related to the content from a CP or an NP. Also, the network interface 530 may receive update information about firmware and update files of the firmware from the NP. The network interface 530 may transmit data over the Internet or to the CP or the NP.

The network interface 530 may selectively receive a desired application among open applications over a network.

The network interface 530 may include a mobile communication module for connecting to a mobile communication network and conducting voice call and video call. The mobile communication module transmits and receives a radio signal to and from at least one of a Base Station (BS), an external terminal, or a server. The radio signal may include a voice call signal, a video call signal, or text/other various types of data involved in multimedia message transmission and reception.

The portable terminal 500 may receive a broadcasting-related signal through a wired/wireless Internet and may further include a broadcasting receiver (not shown).

The broadcasting receiver may receive at least one of a broadcast signal or broadcasting-related information from the outside and may include a tuner, demodulator, a DEMUX, and a decoder for receiving and processing a signal.

The external device interface 535 may serve as an interface between an external device and the portable terminal 500. For interfacing, the external device interface 535 may include an A/V I/O unit (not shown) and/or a wireless communication module (not shown).

The external device interface 535 may be connected to an external device such as a TV, a DVD player, a Blu-ray player, a game console, a camera, a camcorder, a computer (e.g., a laptop computer), a refrigerator, etc. wirelessly or by wire. Then, the external device interface 535 externally receives video, audio, and/or data signals from the external device and transmits the received input signals to the controller 560. In addition, the external device interface 535 may output video, audio, and data signals processed by the controller 560 to the external device. In order to receive or transmit audio, video and data signals from or to the external device, the external device interface 535 includes the A/V I/O unit (not shown) and/or the wireless communication module (not shown).

The A/V I/O unit of the external device interface 535 may include a USB port, a CVBS port, a Component port, an S-video (analog) port, a DVI port, a HDMI port, an RGB port, and a D-sub port.

The wireless communication module of the external device interface 535 may perform short-range wireless communication with other electronic devices. For short-range wireless communication, the wireless communication module may use Near Field Communication (NFC), Bluetooth, RFID, IrDA, UWB, ZigBee, and DLNA.

Besides the above-described external devices, the external device interface 535 may interface between the portable terminal 500 and all external devices connected to the portable terminal 500. The external devices include, for example, a wireless/wired headset, an external charger, a wireless/wired data port, a card socket such as a memory card, a Subscriber Identification Module (SIM) card, and a User Identify Module (UIM) card, an audio I/O port, a video I/O port, and an earphone. The external device interface 535 may receive data or power from such an external device and provide the data or power to each component of the portable terminal 500. In addition, the external device interface 535 may transmit data from the portable terminal 500 to an external device.

Meanwhile, the external device interface 535 may receive applications or an application list from an adjacent external device and provide the applications or the application list to the controller 560 or the memory 550.

The controller 560 may transmit a user command or a programmed control signal to another electronic device connected through the network interface 530 or the external device interface 535 or may execute a command carried in a control signal from an authorized electronic device. For example, the controller 560 may control an image display apparatus, perform a scheduled operation using a PC connected to a home network, check items kept in a smart refrigerator, or receive messages or commands from smart phones of a user's family members.

The sensor unit 540 senses the current state of the portable terminal 500, such as the position, movement, or user touch of the portable terminal 500 and generates a sensing signal to control the operation of the portable terminal 500 according to the sensed state.

The sensor unit 540 may include a proximity sensor, a pressure sensor, and a motion sensor. The proximity sensor may detect an object approaching the portable terminal 500 or the existence or absence of an object in the vicinity of the portable terminal 500 without mechanical contact. The proximity sensor may sense a nearby object based on a change in an alternating magnetic field or static magnetic field or a change rate of capacitance. Two or more proximity sensors may be used depending on the configuration specification of the portable terminal 500.

The pressure sensor may determine whether pressure is applied to the portable terminal 500 and how strong the pressure is. The pressure sensor may be installed at a part of the portable terminal 500 requiring pressure detection according to the environment in which the portable terminal 500 is used. If the pressure sensor is installed in the display 570, a touch input on the display 570 may be distinguished from a pressure-touch input generated on the display 570 with a stronger pressure than the touch input according to a signal output from the pressure sensor. The signal from the pressure sensor may also indicate the magnitude of pressure applied to the display 570, when the pressure-touch input is made.

The motion sensor senses the position or motion of the portable terminal 500 using an acceleration sensor, a gyro sensor, etc. The acceleration sensor converts a variation in acceleration along a direction to an electrical signal. The gyro sensor measures an angular velocity and senses a rotated direction with respect to a reference direction. The gyro sensor may sense information about an action of the portable terminal 500 along x, y and z axes. The acceleration sensor may sense information about the velocity of the portable terminal 500. In general, one or more acceleration sensors representing two or three axial directions are incorporated into a single package. There are some cases in which the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate which is mounted on a main substrate.

The memory 550 may store programs, a platform, and applications required for processing and controlling in the controller 560 or temporarily store processed video, audio, and/or data signals.

The portable terminal 500 may reproduce content stored in the memory 550 (e.g. video files, still image files, music files, text files, application files, etc.) to the user.

In addition, the memory 550 may temporarily store video, audio, and/or data signals received through the external device interface 535 or the network interface 530.

The memory 550 may include, for example, at least one of a flash memory-type storage medium, a hard disk-type storage medium, a multimedia card micro-type storage medium, a card-type memory (e.g. an SD or XD memory), a RAM, or a ROM such as an EEPROM.

While the memory 550 is shown in FIG. 5 as configured separately from the controller 560, to which the present invention is not limited, the memory 550 may be incorporated into the controller 560, for example.

The controller 560 may provide overall control to the portable terminal 500. For example, the controller 560 may control the portable terminal 500 according to a user command received through the user interface 510 or according to an internal program. Especially the controller 560 may access a network and download an application or application list selected by the user to the portable terminal 500 over the network.

The controller 560 may control output of a video or audio signal included in a received signal to the display 570 or the audio output unit 580.

In another example, the controller 560 may control output of a video or audio signal received from an external device through the external device interface 535 to the display 570 or the audio output unit 580 according to an external device video playback command received through the user interface 510.

Meanwhile, the controller 560 may control display of an image of the other party and an image of a user on the display 570 in video call mode according to user settings and may control output of voice based on a voice signal received from the other party to the audio output unit 580.

The controller 560 may control reproduction of content. The content may be content stored in the portable terminal 500, received broadcast content, or external input content. The content may be at least one of a broadcast image, an external input image, an audio file, a still image, a connected Web page, or a text file.

The controller 560 may determine from a touch input pattern whether the touch input corresponds to an input of text such as a character, digit, or symbol. The controller 560 may identify a character corresponding to the trace of the touch input, referring to a database. The database may cover Korean, English, Chinese, Japanese, numerals, symbols, etc. and may be stored in the controller 560 or the memory 550.

The controller 560 may control installation and execution of an application downloaded from an external network, along with various UIs. In addition, the controller 560 may control display of an image related to the executed application on the display 570 according to a user selection.

A platform of the portable terminal 500 may have an OS-based software to implement the above-described operations in the embodiments of the present invention. The platform may be programmed in the controller 560 or a separately procured processor, or stored in the memory 550.

A stack of OS kernel, drivers, middleware, a framework, and applications may be built on a platform of the portable terminal 500 in the embodiments of the present invention.

The OS kernel may be implemented on various OSs including Unix (Linux) and Windows. The OS kernel is an open general-purpose OS kernel that can also be used in other electronic devices.

The display 570 may convert a processed video signal and a processed data signal received from the controller 560 or a video signal and a data signal received from the external device interface 535 into RGB signals, thereby generating driving signals.

The display 570 may be various types of displays such as a PDP, an LCD, an OLED display, a flexible display, and a 3D display.

The display 570 may also be a touch screen that can be used not only as an output device but also as an input device.

The audio output unit 580 outputs audio data received in call termination mode, call mode, recording mode, voice recognition mode, or broadcasting reception mode or stored audio data. The audio output unit 580 also outputs an audio signal related to a call incoming sound, a message reception sound, sound effects, etc. The audio output unit 580 may include a speaker, a buzzer, etc.

The power supply 590 supplies power to each component of the portable terminal 500.

The portable terminal 500 having the above-described structure illustrated in FIG. 5 may be configured so as to operate in a communication system in which data can be transmitted in frames or packets, such as a wireless/wired communication system and a satellite communication system.

FIGS. 7 to 14 are views referred to for describing various examples of the remote controller and the image display apparatus according to the embodiments of the present invention.

Figure 7:
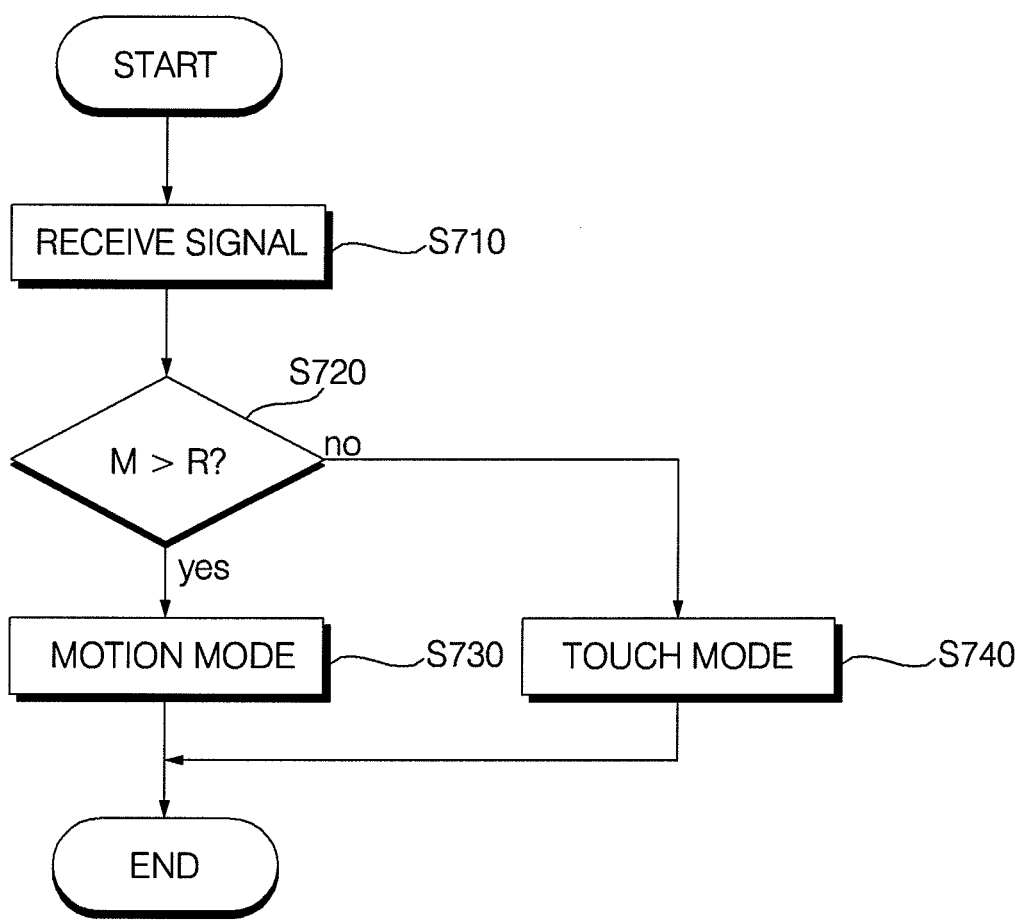
FIGS. 7 to 14B are views referred to for describing various examples of the remote controller and the image display apparatus according to the embodiments of the present invention.

FIG. 7 is a flowchart illustrating a method for operating the image display apparatus according to an embodiment of the present invention.

Referring to FIG. 7, the user input interface 150 receives a signal based on a motion of the remote controller or a signal based on a touch input on the remote controller (S710).

In an alternative embodiment, the network interface 130 may receive the signal, instead of the user input interface 150.

The remote controller may be a pointing device having a touch screen described before with reference to FIGS. 3 and 4.

The pointing device may transmit signals to or receive signals from the image display apparatus 100 in conformance to an RF or IR communication standard. The image display apparatus 100 may display the pointer 205 that moves in accordance with movement of the pointing device on the display 180 and the user may enter commands using the pointer 205.

Since the image display apparatus 100 can receive information about the movement of the pointing device sensed by a sensor of the pointing device, the image display apparatus 100 may determine the degree of the movement of the pointing device.

In the case where the pointing device is provided with a touch screen as stated before, the user may input control commands by touching the touch screen.

The touch screen may be a resistive type, a capacitive type, etc. according to the present invention. The user may generate a touch input on the touch screen using a tool such as a stylus pen as well as the user's finger.

Meanwhile, the remote controller may be a portable terminal described before with reference to FIGS. 5 and 6.

The function of controlling the image display apparatus 100 may be realized into an application or embedded into the portable terminal 500.

The controller 560 of the portable terminal 500 may transmit a user command or a programmed control signal to another connected electronic device through the network interface 530 or the external device interface 535 or may execute a command carried in a control signal received from an authorized electronic device.

Subsequently, the controller 170 of the image display apparatus 100 compares the degree M of the movement of the remote controller with a reference value R (S720).

If the movement degree M is larger than the reference value R, the image display apparatus 100 operates in motion mode to control the image display apparatus 100 based on the movement of the remote controller (S730).

On the contrary, if the movement degree M is equal to or smaller than the reference value R, the image display apparatus 100 operates in touch mode to control the image display apparatus 100 based on the touch input of the remote controller (S740).

That is, the controller 170 may switch the control mode of the image display apparatus 100 according to the degree of the action of the remote controller. From the perspective of the remote controller, if a large gesture is made, the remote controller functions as a motion remote controller. If a small gesture is made, the remote controller functions as a touch remote controller by automatically activating touches.

Even though the user moves the remote controller, recognizing that the remote controller is in the motion mode, he or she may touch the touch screen of the remote controller. Nonetheless, if the movement degree M of the remote controller is larger than the reference value R, the remote controller operates in the motion mode, thereby preventing a wrong input according to the embodiment of the present invention.

Furthermore, since the user can enter a simple control command without the need for selecting a menu by touching the touch screen, the user can easily use the remote controller without distractions.

Figure 9:
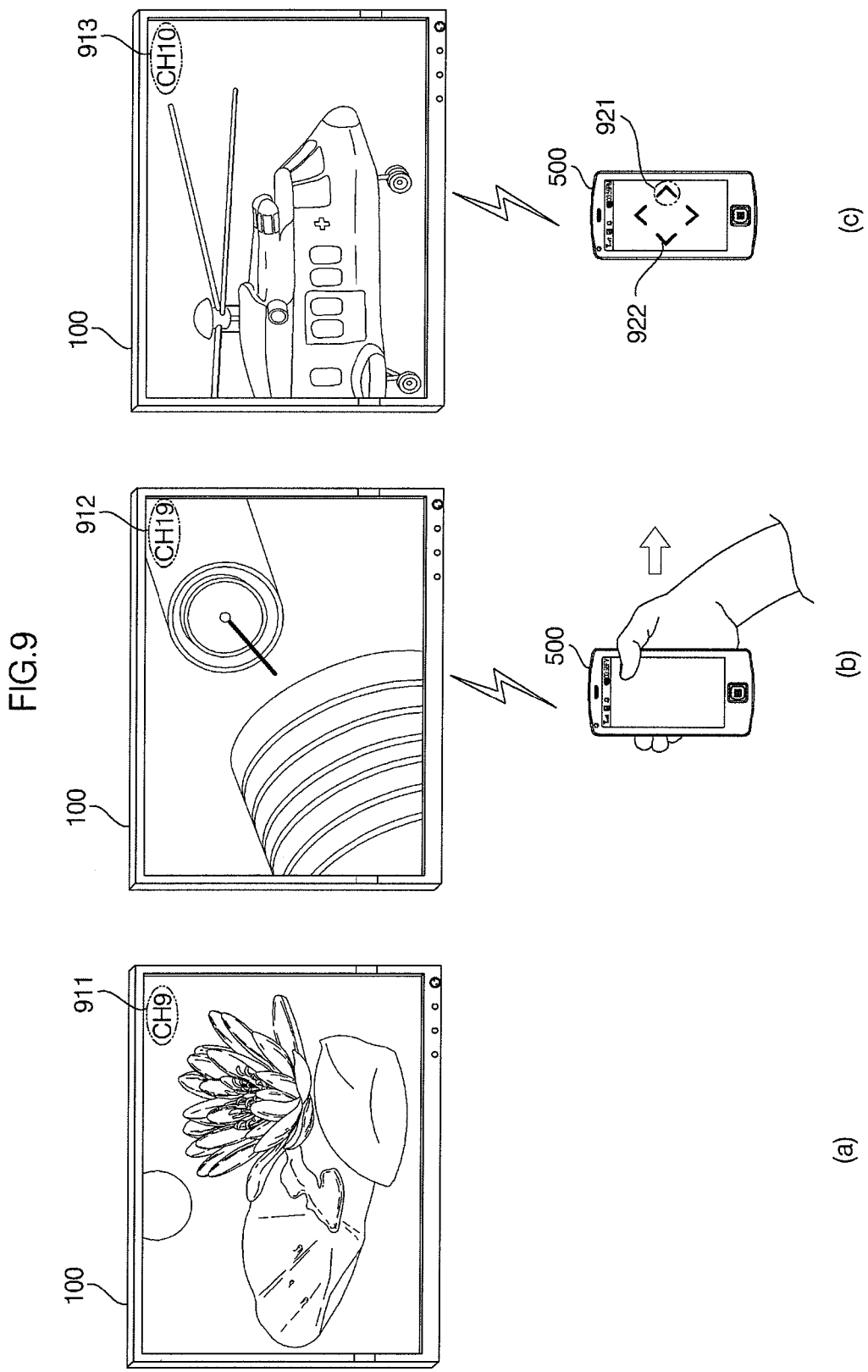
Figure 10:
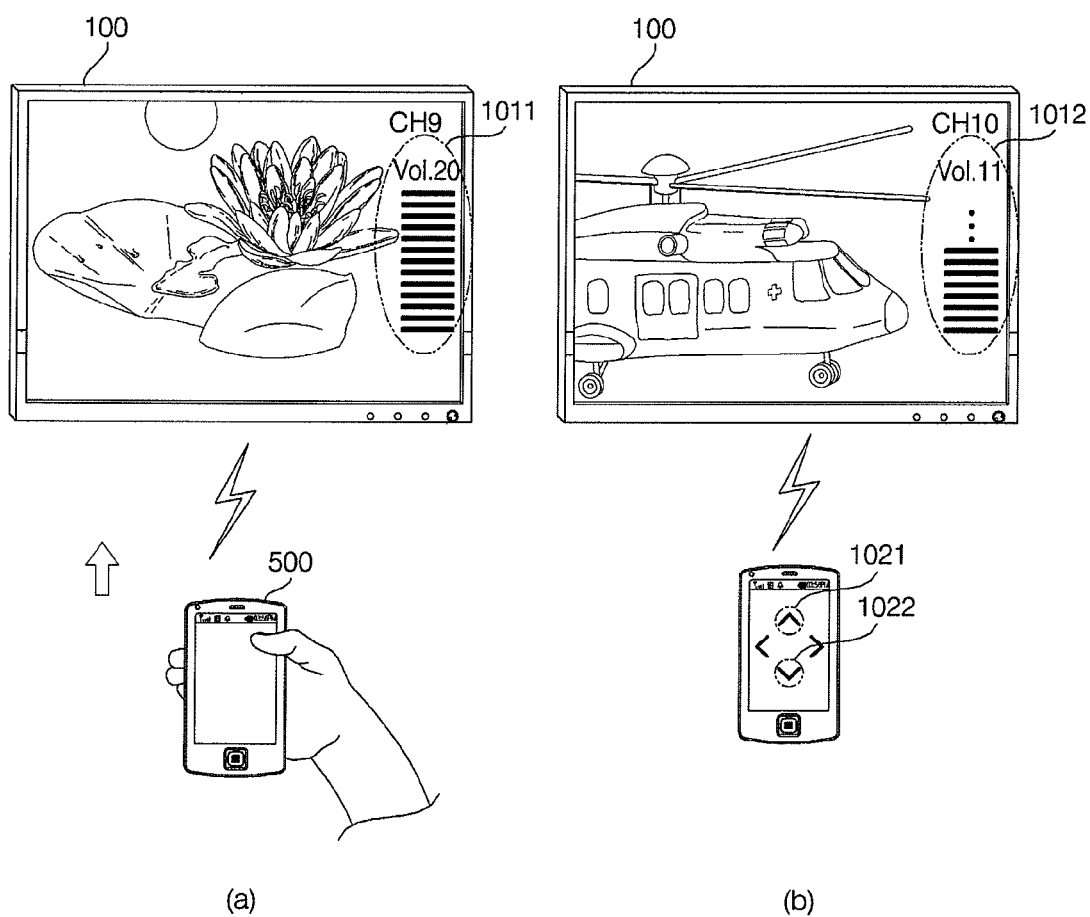

The same command may bring about different degrees of actions depending on whether the image display apparatus 100 is placed in the motion mode or the touch mode. Therefore, various inputs may be made. For example, a coarse change may be made in the motion mode, whereas a fine change may be made in the touch mode, as illustrated in FIGS. 8, 9 and 10.

Figure 8:
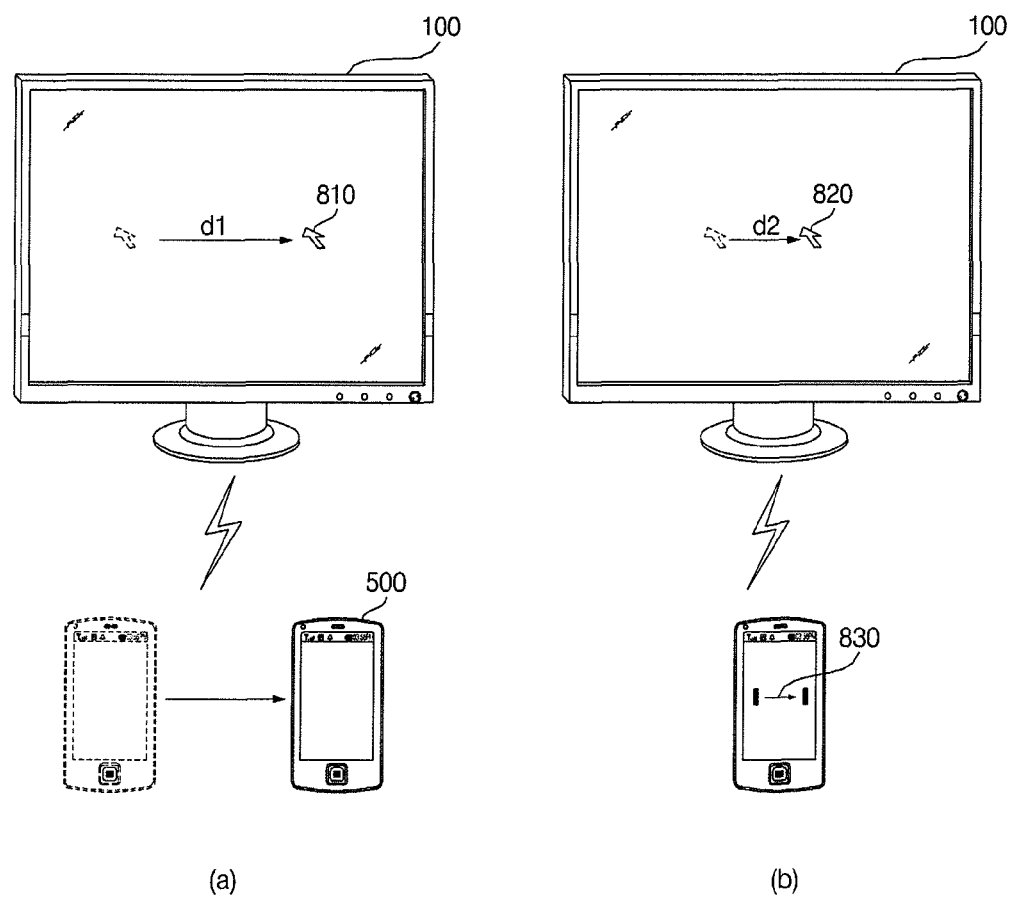

FIG. 8 illustrates exemplary shifts of a pointer displayed on the image display apparatus 100 using the portable terminal 500.

Referring to FIG. 8, upon receipt of a pointer shift input, the controller 170 may control a distance d1 for which a pointer 810 moves in the motion mode to be larger than a distance d2 for which a pointer 820 moves in the touch mode.

To prevent a wrong input, it may be regulated that the pointer moves only in pointer mode.

If a received signal is for changing a setting value, the controller 170 may control a value change to be larger in the motion mode than in the touch mode.

FIG. 9 illustrates exemplary channel switching in the image display apparatus 100 using the portable terminal 500.

The controller 170 may control channel switching, when the remote controller moves sideways for a distance equal to or larger than the reference value.

Referring to FIG. 9, when the user moves the remote controller to the right farther than a predetermined distance while viewing CH9 indicated by reference numeral 911, the current channel may be switched to CH19 indicated by reference numeral 912.

On the other hand, if the user moves the remote controller to the right less than the predetermined distance while viewing CH9 indicated by reference numeral 911, the current channel may be switched to CH10 indicated by reference numeral 913 by a touch input.

In this case, the touch input may be generated by touching a predetermined right-hand area of the touch screen of the remote controller or by touching a menu 921 or 922 as illustrated in FIG. 9(c).

In alternative embodiments, the menus 921 and 922 may be already displayed or activated when the remote controller moves less than the reference value.

In the illustrated case of FIG. 9, a channel number is changed by 10 at one motion of the remote controller in the motion mode and by 1 at one touch on the touch screen of the remote controller in the touch mode. However, this is purely exemplary and thus should not be construed as limiting the present invention. Accordingly, the channel decrement or increment may vary according to settings.

FIG. 10 illustrates exemplary control of sound volume in the image display apparatus 100 using the portable terminal 500.

More specifically, the user increases the volume level from 10 to 20 in the motion mode or to 11 in the touch mode using the portable terminal 500, while viewing the image display apparatus 100.

The controller 170 may control change of the sound volume when the remote controller moves up or down for a distance equal to or larger than the reference value.

That is, the user may increase the sound volume by 10 levels at each time by moving up the remote controller more than the reference value. In addition, the user may increase the sound volume by a smaller unit, for example, one level at each time by touching a volume-up menu 1021 between volume menus 1021 and 1022.

Meanwhile, when the remote controller moves in a predetermined pattern, the controller 170 may control display of a menu on the display 180.

Figure 11:
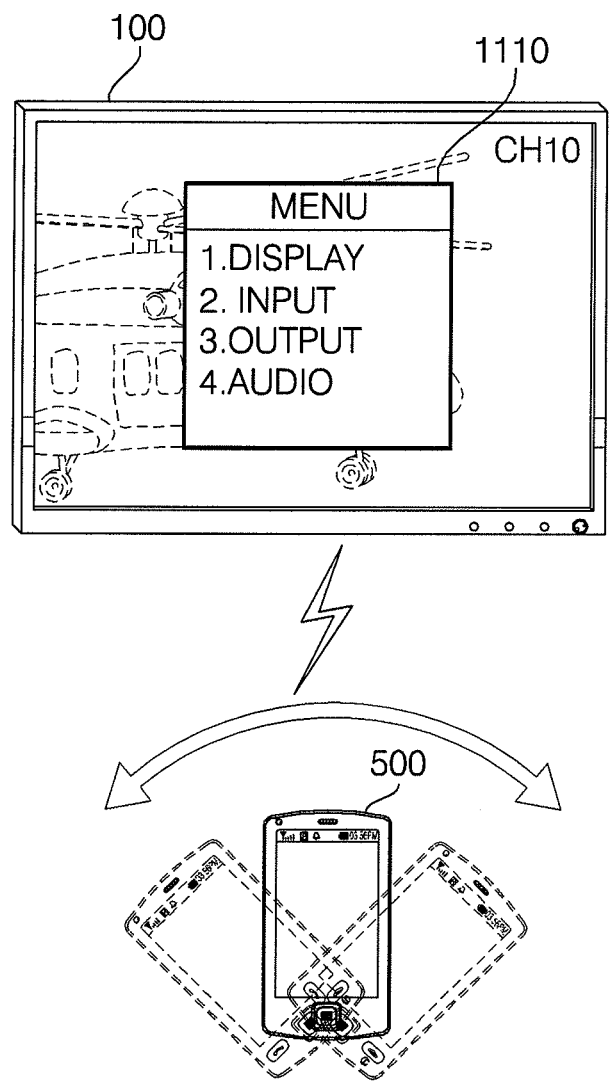

Referring to FIG. 11, when the user repeatedly moves the portable terminal 500 sideways, a menu 110 is displayed on the display 180.

The illustrated pattern triggering a menu in FIG. 11 is purely exemplary and thus a pattern other than the repeated sideways movement of the remote controller may be set to display the menu.

On the other hand, it may be preset that the repeated sideways movement of the portable terminal 500 is assigned to another command, for example, a pointer display command or a wake-up command.

Figure 12:
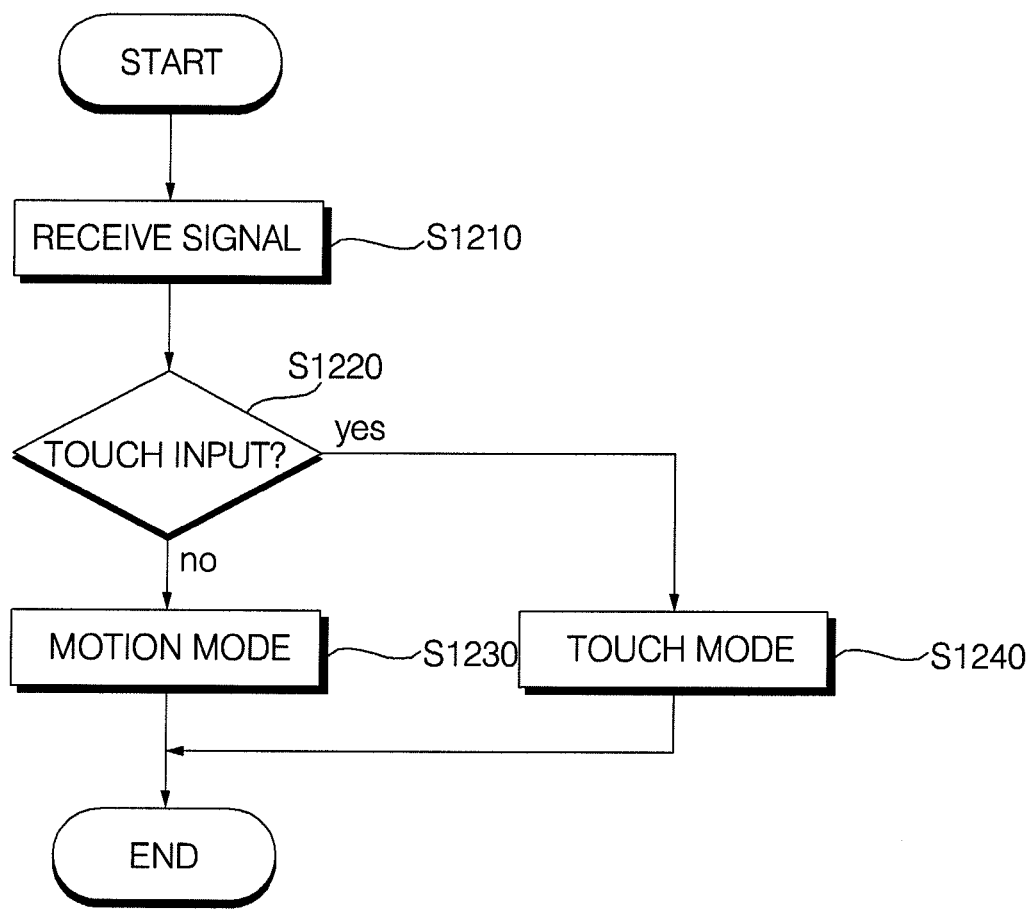

FIG. 12 is a flowchart illustrating a method for operating the image display apparatus according to another embodiment of the present invention.

Referring to FIG. 12, the user input interface 150 receives from the remote controller a signal based on a motion of the remote controller or a signal based on a touch input on the remote controller (S1210).

In an alternative embodiment, the network interface 130 may receive the signal, instead of the user input interface 150.

As stated before, the remote controller may be a pointing device or portable terminal having a touch screen.

Subsequently, the controller 170 determines whether there is any touch input (S1220).

In the absence of a touch input, the controller 170 operates in the motion mode to control the image display apparatus 100 based on the movement of the remote controller (S1230). In the presence of a touch input, the controller 170 may operate in the touch mode to control the image display apparatus 100 based on the touch input of the remote controller (S1240).

The embodiment of the present invention illustrated in FIG. 12 differs from the embodiment illustrated in FIGS. 7 to 11 in that in the presence of a touch input, the touch input is considered with priority and thus the image display apparatus operates in the touch mode.

That is, if the user touches the touch screen of the remote controller, the image display apparatus is controlled in the touch mode based on the touch input even though the user moves the remote controller. Otherwise, the image display apparatus is controlled in the motion mode.

Accordingly, the embodiment of the present invention described with reference to FIGS. 8 to 11 may be performed in a similar manner.

In alternative embodiments, the user may be allowed to select the control mode of FIG. 7 or FIG. 12.

The user may determine his or her use specification for the remote controller and thus may select a more convenient control mode according to the use specification.

Since both the motion mode and the touch mode are available in the selected control mode, user convenience can be further increased.

FIGS. 13A to 14B illustrate embodiments of the present invention.

Figure 13A:
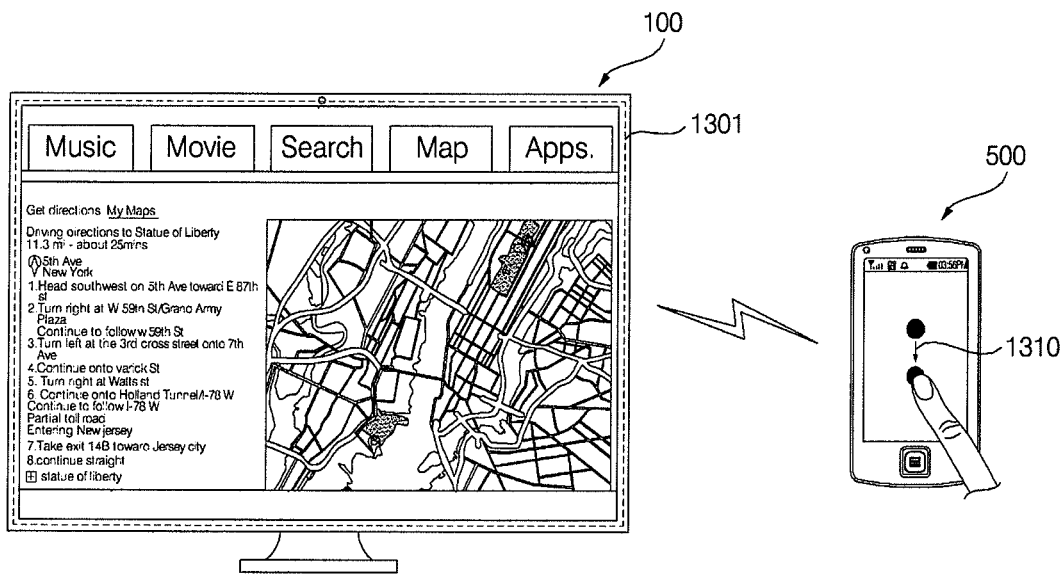

Referring to FIG. 13A, the image display apparatus 100 displays a screen 1301 including a part of a Web page on the display.

To zoom in a part of the screen 1301, the user may make a downward sliding touch input 1310 on the touch screen of the portable terminal 500.

Unlike the touch input 1310 illustrated in FIG. 13A, the user may double-tap on a center area of the touch screen of the portable terminal 500. Then the portable terminal 500 may transmit a signal carrying information about the double-tapped area of the touch screen to the image display apparatus 100.

That is, the type and direction of a touch input corresponding to the zoom-in function are exemplary and thus may vary depending on implementations.

Meanwhile, when the user makes a sliding touch input on the touch screen of the portable terminal 500, a part of an image displayed on the image display apparatus 100 may be enlarged or the whole image may be contracted.

Or if the user double-taps on the center area of the touch screen of the portable terminal 500, the image display apparatus 100 receives a signal from the portable terminal 500. The image display apparatus 100 detects information about the double-tapped area of the touch screen from the received signal and determines a display area of the image display apparatus 100 corresponding to the detected double-tapped area of the touch screen. The image display apparatus 100 enlarges content displayed on the determined display area. In another embodiment of the present invention, the image display apparatus 100 may contract the content displayed on the determined display area.

Figure 13B:
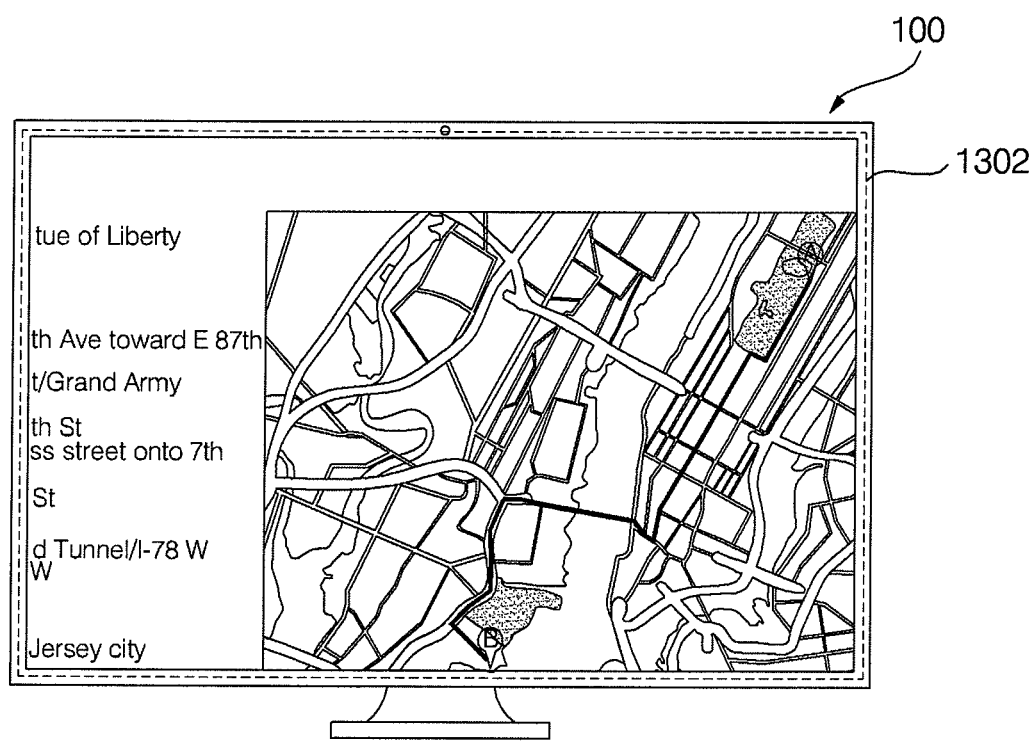

FIG. 13B illustrates a screen 1302 with enlarged content on the display of the image display apparatus 100 according to an embodiment of the present invention.

Figure 14A:
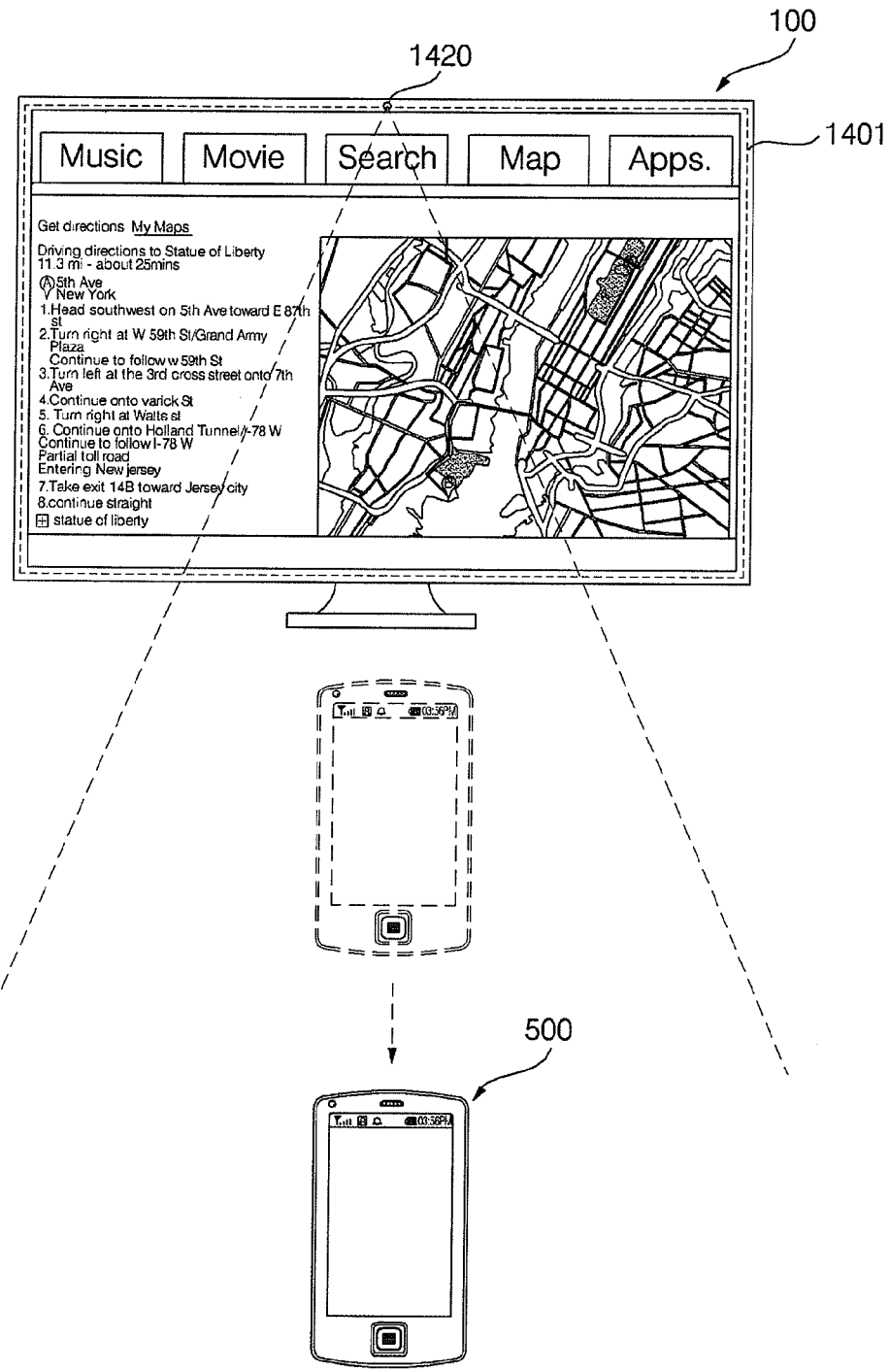
Figure 14B:
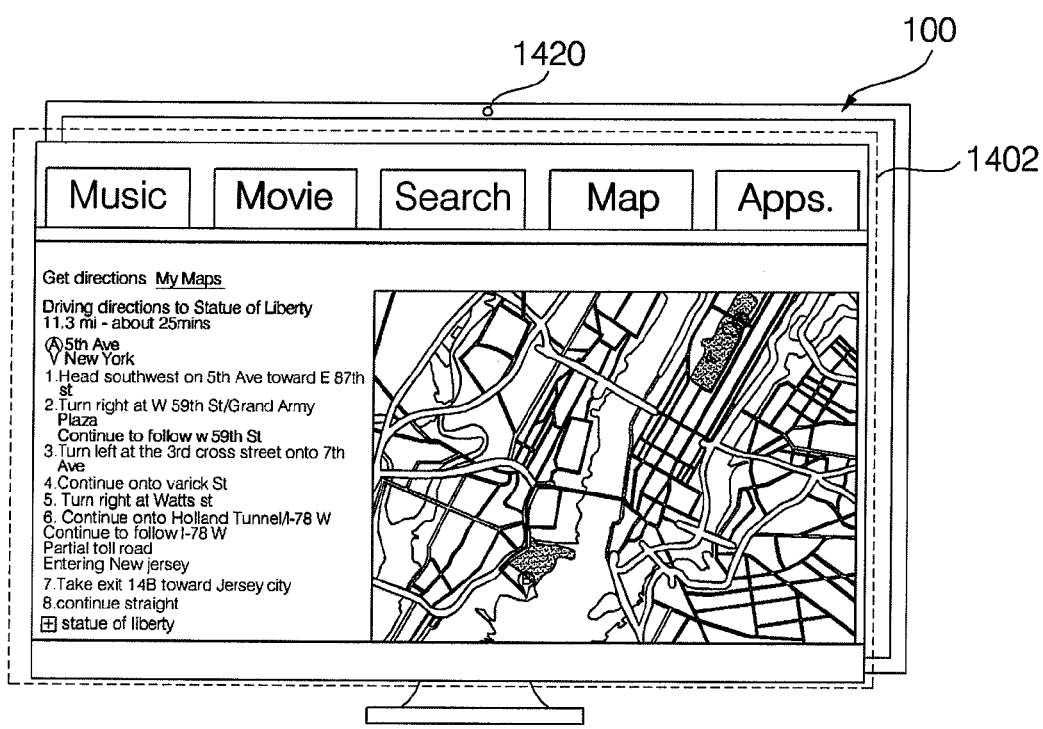

FIGS. 13A and 13B illustrate an exemplary operation that is performed, upon receipt of a user's touch input and FIGS. 14A and 14B illustrate an exemplary operation that is performed, upon receipt of a user's motion input through the portable terminal.

Referring to FIGS. 14A and 14B, as the remote controller, particularly the portable terminal 500 moves while a Web page is displayed on the display 180 of the image display apparatus 100, a 2D image is converted to a 3D image on the display 180.

Meanwhile, the controller 170 may acquire information about the distance between the image display apparatus and the remote controller from motion information about the remote controller. That is, the remote controller 200 may transmit z-axis movement information as well as information about X-axis or Y-axis rotation and movement to the image display apparatus. The z-axis movement information may represent movement of the remote controller 200 nearer to or farther from the image display apparatus 100. Thus, the controller 170 may acquire information about the distance between the image display apparatus and the remote controller.

Alternatively or additionally, the controller 170 may acquire information about the distance between the image display apparatus 100 and the remote controller 500 through a detector 1420 such as a depth camera.

If the remote controller 500 recedes from the image display apparatus 100, that is, the distance increases, a 2D image 1401 may be converted to a 3D image 1402 as illustrated in FIGS. 14A and 14B. Consequently, the user can easily enter 3D mode.

In accordance with the embodiment of the present invention, the remote controller can operate in a different control mode based on a touch pattern and a motion of the remote controller.

As described above, the remote controller that can control the image display apparatus according to the embodiment of the present invention includes a touch screen for displaying a UI through which a user can enter a control command for the image display apparatus, a communication module for transmitting a signal carrying a control command to the image display apparatus, and a controller for controlling the touch screen and the communication module to transmit a control command corresponding to a motion of the remote controller or a touch input on the touch screen of the remote controller to the image display apparatus.

The remote controller may be a portable terminal or a pointing device.

The controller controls the touch screen and the communication module to transmit a different control command to the image display apparatus according to the degree of the motion or the presence or absence of the touch input.

As described above, the image display apparatus according to the foregoing exemplary embodiments can determine if at least a touch input or a motion input from the electronic device is received, set an input processing mode of the image display apparatus to be one of a motion-based input mode and a touch-based input mode based on the determination result.

Hence, the image display apparatus may include a display unit and a controller configured to control the display unit and to determine if at least a touch input or a motion input from the electronic device is received, set an input processing mode of the image display apparatus to be one of a motion-based input mode and a touch-based input mode based on the determination result, and process an input signal from the electronic device according to the set input processing mode.

And a method of remotely controlling an image display apparatus using an electronic device, the image display apparatus including a controller, the method comprises determining, by the controller of the image display apparatus, if at least a touch input or a motion input from the electronic device is received; setting an input processing mode of the image display apparatus to be one of a motion-based input mode and a touch-based input mode based on the determination result, and processing, by the controller, an input signal from the electronic device according to the set input processing mode.

In another example, the remote controller may determine if at least a touch input or a motion input and set an input processing mode of the image display apparatus to be one of a motion-based input mode and a touch-based input mode based on the determination result.

In accordance with the embodiment of the present invention, a remote controller for controlling an image display apparatus, the remote controller includes a touch screen configured to display a user interface for receiving a touch input to the touch screen, a communication module, and a controller configured to control the touch screen and the communication module, and to transmit, through the communication module, one or more control commands for remotely controlling the image display apparatus, the one or more control commands corresponding to a motion of the remote controller or the touch input to the touch screen, wherein the controller generates a different control command depending on a degree of the motion of the remote controller or a presence or absence of the touch input to the touch screen, and transmits the generated command to the image display apparatus through the communication module.

And a method of remotely controlling an image display apparatus by a remote controller, the remote controller including a touch screen, a communication module and a controller, the method comprises displaying, on the touch screen, a user interface for receiving a touch input to the touch screen and transmitting, through the communication module, one or more control commands for remotely controlling the image display apparatus, the one or more control commands corresponding to a motion of the remote controller or the touch input to the touch screen, the transmitting step including generating, by the controller, a different control command depending on a degree of the motion of the remote controller or a presence or absence of the touch input to the touch screen, and transmitting, through the communication module, the generated command to the image display apparatus.

In this case, the controller of the image display apparatus the may process an input signal from the electronic device according to the set input processing mode.

As is apparent from the above description of the present invention, since a plurality of control modes are provided, a user can use an image display apparatus conveniently.

The methods for operating the remote controller and the image display apparatus according to the foregoing exemplary embodiments are not restricted to the exemplary embodiments set forth herein. Therefore, variations and combinations of the exemplary embodiments set forth herein may fall within the scope of the present invention.

The methods for operating the remote controller and the image display apparatus according to the foregoing exemplary embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image display apparatus remotely controllable by an electronic device, the image display apparatus comprising:
   a display unit; and
   a controller configured to control the display unit and to:
   determine if at least a touch input or a motion input from the electronic device is received,
   set an input processing mode of the image display apparatus to be one of a motion-based input mode and a touch-based input mode based on the determination result,
   process an input signal from the electronic device according to the set input processing mode,
   control a same type of command having different degrees of actions depending on whether the image display apparatus is placed in the motion-based input mode or the touch-based input mode, and
   if the input signal from the electronic device is an input for changing a setting value of the image display apparatus, change the setting value to be larger in the motion-based input mode than in the touch-based input mode based on the same input signal,
   wherein, when the controller determines that at least the motion input from the electronic device is received, the controller is further configured to:
   compare a degree of motion of the motion input with a predetermined reference value, and
   selectively set the input processing mode of the image display apparatus to be one of the motion-based input mode and the touch-based input mode based on the comparison result,
   wherein the controller is further configured to set the input processing mode of the image display apparatus to be the motion-based input mode, if the comparison result indicates that the degree of motion of the motion input is equal to or larger than the predetermined reference value, and
   wherein the controller is further configured to set the input processing mode of the image display apparatus to be the touch-based input mode, if the comparison result indicates that the degree of motion of the motion input is smaller than the predetermined reference value.

2. The image display apparatus according to claim 1, wherein, when the controller determines that at least the touch input from the electronic device is received, the controller is further configured to:
   recognize a presence of the touch input, and
   set the input processing mode of the image display apparatus to be the touch-based input mode in view of the presence of the touch input.

3. The image display apparatus according to claim 1, wherein, when the controller determines that only the motion input from the electronic device is received without any touch input from the electronic device, the controller is further configured to:
   recognize an absence of the touch input, and
   set the input processing mode of the image display apparatus to be the motion-based input mode in view of the absence of the touch input.

4. The image display apparatus according to claim 1, wherein the controller is further configured to:
   provide a menu for a user to select a criterion among a plurality of choices by which the input processing mode is to be set up,
   wherein the choices include i) based on a degree of motion by the electronic device, and ii) based on a presence or absence of a touch input from the electronic device.

5. The image display apparatus according to claim 1, wherein the electronic device is a portable terminal, a mobile terminal, or a pointing device having a touch screen.

6. The image display apparatus according to claim 1, wherein if the input signal from the electronic device is an input for shifting a pointer on the display unit, the controller is configured to control the pointer to be shifted for a longer distance in the motion-based input mode than in the touch-based input mode based on the same input signal.

7. The image display apparatus according to claim 1, wherein in the motion-based input mode, if the electronic device moves in a predetermined direction for a distance equal to or larger than a reference value, the controller processes this motion input as a channel switching and switches a channel for the display unit.

8. The image display apparatus according to claim 1, wherein in the motion-based input mode, if the electronic device in a predetermined direction for a distance equal to or larger than a reference value, the controller processes this motion input as a volume change and changes a sound volume for the image display apparatus.

9. The image display apparatus according to claim 1, wherein in the motion-based input mode, if the electronic device moves in a predetermined pattern, the controller processes this motion input as a menu command and controls display of a menu on the display unit.

* * * * *